(12) United States Patent
Yamaji et al.

(10) Patent No.: US 8,988,423 B2
(45) Date of Patent: Mar. 24, 2015

(54) ELECTRONIC ALBUM GENERATING APPARATUS, STEREOSCOPIC IMAGE PASTING APPARATUS, AND METHODS AND PROGRAMS FOR CONTROLLING OPERATION OF SAME

(75) Inventors: Kei Yamaji, Tokyo (JP); Koichi Yahagi, Tokyo (JP); Kazuhiro Mino, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 398 days.

(21) Appl. No.: 13/210,954

(22) Filed: Aug. 16, 2011

(65) Prior Publication Data

US 2012/0069001 A1  Mar. 22, 2012

(30) Foreign Application Priority Data

Sep. 17, 2010  (JP) ................................ 2010-208853

(51) Int. Cl.
*G06T 15/00* (2011.01)
*H04N 13/00* (2006.01)
*G06T 11/60* (2006.01)

(52) U.S. Cl.
CPC ............ *H04N 13/0022* (2013.01); *G06T 11/60* (2013.01)
USPC ........................................... 345/419; 348/46

(58) Field of Classification Search
CPC ...................................................... G06T 15/00
USPC ............................................ 345/419; 348/46
See application file for complete search history.

(56) References Cited

U.S. PATENT DOCUMENTS

| | | | |
|---|---|---|---|
| 6,963,672 B1 * | 11/2005 | Watanabe et al. ............. | 382/305 |
| 2003/0043262 A1 * | 3/2003 | Takemoto et al. .............. | 348/46 |
| 2003/0160824 A1 * | 8/2003 | Szumla ......................... | 345/769 |
| 2005/0081147 A1 * | 4/2005 | Tanaka et al. ................. | 715/517 |
| 2005/0089212 A1 * | 4/2005 | Mashitani et al. ............ | 382/154 |
| 2005/0220366 A1 * | 10/2005 | Watanabe et al. ............. | 382/305 |
| 2006/0192776 A1 * | 8/2006 | Nomura et al. ............... | 345/419 |
| 2007/0268271 A1 * | 11/2007 | Kinjo ............................ | 345/173 |
| 2008/0075338 A1 * | 3/2008 | Muramatsu et al. .......... | 382/118 |
| 2009/0287996 A1 * | 11/2009 | Norimatsu et al. ........... | 715/243 |
| 2010/0039504 A1 * | 2/2010 | Takahashi et al. ............. | 348/54 |
| 2010/0259544 A1 * | 10/2010 | Chen et al. .................... | 345/441 |
| 2011/0161843 A1 * | 6/2011 | Bennett et al. ................ | 715/760 |
| 2012/0044249 A1 * | 2/2012 | Mashitani et al. ............ | 345/419 |
| 2013/0097509 A1 * | 4/2013 | Gomes ......................... | 715/723 |
| 2013/0235036 A1 * | 9/2013 | Fukui, Koji ................... | 345/419 |

FOREIGN PATENT DOCUMENTS

| | | |
|---|---|---|
| JP | 4259913 | 2/2009 |
| JP | 2010-045584 | 2/2010 |
| JP | 2010-072934 | 4/2010 |
| KR | WO2008013352 * | 1/2008 |

* cited by examiner

*Primary Examiner* — Richard Torrente
*Assistant Examiner* — Irfan Habib
(74) *Attorney, Agent, or Firm* — Young & Thompson

(57) ABSTRACT

Viewing of stereoscopic images is facilitated for every page of an electronic album. A page constituting an electronic album is selected. A stereoscopic image is then selected and the selected stereoscopic image is pasted in an image compositing area. An amount of parallax has been defined for the image compositing area, and the amount of parallax of the image compositing area in which the stereoscopic image has been pasted is read. The amount of parallax of the stereoscopic image is changed to that of the image compositing area.

18 Claims, 23 Drawing Sheets

*Fig. 4*

```
LINE
 1   <?xml version="1.0" encoding="utf-8" ?>
 2   <background="C:¥background1.jpg">
 3   <pictures>
 4   <picture id="1" left="80"  top="80"  width="320" height="240" 3d="5"/>
 5   <picture id="2" left="560" top="80"  width="320" height="240" 3d="5"/>
 6   <picture id="3" left="80"  top="400" width="320" height="240" 3d="15"/>
 7   <picture id="4" left="560" top="400" width="320" height="240" 3d="15"/>
 8   <picture id="5" left="80"  top="720" width="320" height="240" 3d="5"/>
 9   <picture id="6" left="560" top="720" width="320" height="240" 3d="5"/>
10   </pictures>
```

LEFT-EYE IMAGE

70L

RIGHT-EYE IMAGE

70R

AMOUNT OF PARALLAX DEFINED FOR STEREOSCOPIC IMAGE

```
LINE
  1    <?xml version="1.0" encoding="utf-8" ?>
  2    <background="C:¥background2.jpg">
  3    <areas>
  4    <area id="1" 3d="10">
  5    <circle cx="110" cy="100" r="60">
  6    </area>
  7    <area id="2" type="other" 3d="5"/>
  8    </areas>
```

*Fig. 18*

| AMOUNT OF OFFSET | | DEFINITION |
|---|---|---|
| [%] | PIXELS | |
| 5 | 50 | AMOUNT OF PARALLAX: SMALL |
| 10 | 100 | AMOUNT OF PARALLAX: MEDIUM |
| 15 | 150 | AMOUNT OF PARALLAX: LARGE |

ELECTRONIC ALBUM GENERATING APPARATUS, STEREOSCOPIC IMAGE PASTING APPARATUS, AND METHODS AND PROGRAMS FOR CONTROLLING OPERATION OF SAME

BACKGROUND OF THE INVENTION

1. Field of the Invention

This invention relates to an electronic album generating apparatus and a stereoscopic image pasting apparatus and to methods and programs for controlling the operation thereof.

2. Description of the Related Art

When an album is to be created utilizing a computer, the features of images in layout frames are described in a template. According to a conventional technique, the features of a plurality of images are compared and images that match are selected as candidate images to be placed in the layout frames (see Japanese Patent Application Laid-Open No. 2010-72934). However, if an image one is attempting to paste in a desired layout frame does not possess the feature corresponding to this layout frame, the image cannot be pasted in the layout frame. Further, since the amount of stereoscopic pop-up (depth perception) of a stereoscopic image is not uniquely decided when a stereoscopic image is displayed, there is a technique for adjusting the amount of pop-up (see Japanese Patent Application Laid-Open No. 2010-45584). Since the amount of pop-up varies depending upon enlargement and reduction of image size, there is a technique for determining whether a changed amount of pop-up falls within parallax limits (see Japanese Patent No. 4259913).

However, in a case where a stereoscopic image is pasted in an electronic album, no consideration has been given to so arranging it that the viewing of stereoscopic images is facilitated on every page of an electronic album.

SUMMARY OF THE INVENTION

An object of the present invention is to so arrange it that when stereoscopic images are pasted into an electronic album, the stereoscopic images are easy to view on every page of the electronic album.

Another object of the present invention is to so arrange it that when stereoscopic images are pasted into a template, the stereoscopic images are easy to view.

An electronic album generating apparatus according to a first aspect of the present invention comprises: an image pasting device (image pasting means) for pasting a stereoscopic image on a page constituting an electronic album, wherein a parallax amount for a stereoscopic display has been defined for each page of the electronic album, the electronic album having a plurality of pages on which stereoscopic images are to be pasted (one or a plurality of stereoscopic images may be pasted on a page); a parallax-amount reading device (parallax-amount reading means) for reading a parallax amount that has been defined for the page on which the stereoscopic image has been pasted by the image pasting device; and a parallax-amount changing device (parallax-amount changing means) for changing a parallax amount, which has been defined for the stereoscopic image pasted on the page by the image pasting device, to the parallax amount that has been read by the parallax-amount reading device.

The first aspect of the present invention also provides an operation control method suited to the above-described electronic album generating apparatus. Specifically, the first aspect of the present invention provides a method of controlling operation an electronic album generating apparatus, comprising the steps of: pasting a stereoscopic image on a page constituting an electronic album, wherein a parallax amount for a stereoscopic display has been defined for each page of the electronic album, the electronic album having a plurality of pages on which stereoscopic images are to be pasted; reading a parallax amount that has been defined for the page on which the stereoscopic image has been pasted; and changing a parallax amount, which has been defined for the stereoscopic image that has been pasted on the page, to the parallax amount that has been read.

The first aspect of present invention further provides a computer-readable program for implementing the above-described method of controlling operation of an electronic album generating apparatus. It may also be arranged to provide a recording medium, on which this program has been stored, removably inserted into a computer.

In accordance with the first aspect of the present invention, an electronic album contains a plurality of pages on which stereoscopic images are pasted. Defined for each page is an amount of parallax for presenting a stereoscopic display, and stereoscopic images are pasted on such pages. When this is done, the amount of parallax that has been defined for a page on which a stereoscopic image has been pasted is read. An amount of parallax that has been defined for a stereoscopic image pasted on the page is changed to the amount of parallax that has been read. When a stereoscopic image is pasted on a page of the electronic album, the amount of parallax that has been defined for the stereoscopic image is not used. Instead, the amount of parallax is changed to the amount of parallax that has been defined for the page. As a result, stereoscopic images become easy to view on every page of the electronic album.

A plurality of pasting areas into which stereoscopic images are to be pasted are defined for the page, and a parallax amount for a stereoscopic display is defined for each of the plurality of pasting areas. In this case, by way of example, the parallax-amount reading device would read the parallax amount that has been defined for the pasting area into which a stereoscopic image has been pasted by the image pasting device.

The above-mentioned page is one page of a two-page spread, and a parallax amount of a pasting area that has been defined for an inner side of the page relative to the center thereof has been stipulated to be greater than a parallax amount of a pasting area that has been defined on an outer side of the page relative to the center thereof.

The above-mentioned page is one page of a spread, and the apparatus further comprises a first parallax-amount revising device (first parallax-amount revising means) for revising the parallax amount in such a manner that a parallax amount of a pasting area that has been defined for an inner side of the page relative to the center thereof will be greater than a parallax amount of a pasting area that has been defined for an outer side of the page relative to the center thereof.

The apparatus further comprises a second parallax-amount revising device (second parallax-amount revising means) which, in a case where a plurality of stereoscopic images have been pasted on the same page by the image pasting device, is for revising the parallax amount, to which the change has been made by the parallax-amount changing device, in such a manner that the greater the size of a stereoscopic image among the plurality of stereoscopic images that have been pasted on the same page, the greater the parallax amount of this stereoscopic image becomes.

The apparatus further comprises: a parallax-amount adjusting device (parallax-amount adjusting means) for adjusting a parallax amount of a stereoscopic image that has been pasted into a first pasting area among the plurality of the pasting areas, wherein stereoscopic images have been pasted into respective ones of the plurality of pasting areas; and a third parallax-amount revising device (third parallax-amount revising means) for revising amounts of parallax of pasting areas, from among the plurality of pasting areas with the exception of the pasting area that has been adjusted by the parallax-amount adjusting device, in such a manner that a size relationship among parallax amounts in the plurality of pasting areas will be the same before and after the adjustment made by the parallax-amount adjusting device.

The apparatus further comprises a warning device (warning means) for issuing a warning when the difference between a parallax amount that has been defined for a stereoscopic image pasted by the image pasting device and a parallax amount that has been defined for a pasting area into which a stereoscopic image has been pasted is greater than a first threshold value.

Preferably, the apparatus further comprises a display control device (display control means) for controlling a display unit in such a manner that a pasting area, from among the plurality of pasting areas, for which has been defined a parallax amount for which the difference with respect to a parallax amount that has been defined for a stereoscopic image that will be pasted in this pasting area is less than a second threshold value, will be displayed differently from other pasting areas.

A stereoscopic image pasting apparatus according to a second aspect of the present invention comprises: an image pasting device (image pasting means) for pasting a plurality of stereoscopic images on one template for which a parallax amount for a stereoscopic display has been defined; a parallax-amount reading device (parallax-amount reading means) for reading the parallax amount that has been defined for the template on which the plurality of stereoscopic images have been pasted by the image pasting device; and a parallax-amount changing device (parallax-amount changing means) for changing each parallax amount, which has been defined for the plurality of stereoscopic images that have been pasted on the template by the image pasting device, to the parallax amount that has been read by the parallax-amount reading device.

The second aspect of the present invention also provides an operation control method suited to the above-described stereoscopic image pasting apparatus. Specifically, the first aspect of the present invention provides a method of controlling operation of a stereoscopic image pasting apparatus, comprising the steps of: pasting a plurality of stereoscopic images on one template for which a parallax amount for a stereoscopic display has been defined; reading the parallax amount that has been defined for the template on which the plurality of stereoscopic images have been pasted; and changing each parallax amount, which has been defined for the plurality of stereoscopic images that have been pasted on the template, to the parallax amount that has been read.

The second aspect of present invention further provides a computer-readable program for implementing the above-described method of controlling operation of a stereoscopic image pasting apparatus. It may also be arranged to provide a recording medium, on which this program has been stored, removably inserted into a computer.

In accordance with the second aspect of the present invention, an amount of parallax for presenting a stereoscopic display has been defined for a template. A plurality of stereoscopic images are pasted on this single template (image pasting areas may or may not be defined for the template). When this is done, the amount of parallax that has been defined for the template on which the plurality of stereoscopic images have been pasted is read. Amounts of parallax that have been defined for the plurality of stereoscopic images pasted on the template are changed to the amount of parallax read from the template. When a plurality of stereoscopic image are pasted on a template, the amounts of parallax that have been defined for the stereoscopic images are not used. Instead, the amounts of parallax are changed to the amount of parallax that has been defined for the template. As a result, stereoscopic images become easy to view.

A plurality of pasting areas into which stereoscopic image are pasted are defined for the template, and a parallax amount for a stereoscopic display is defined for each of the plurality of pasting areas. In this case, by way of example, the parallax-amount reading device would read parallax amounts that have been defined in the pasting areas into which stereoscopic images have been pasted by the image pasting device.

The apparatus further comprises a first parallax-amount revising device (first parallax-amount revising means) for revising the parallax amount, to which the change has been made by the parallax-amount changing device, in such a manner that the greater the size of a stereoscopic image that has been pasted by the image pasting device, the greater the parallax amount becomes.

The apparatus further comprises: a parallax-amount adjusting device (parallax-amount adjusting means) for adjusting a parallax amount of a stereoscopic image that has been pasted into a first pasting area among the plurality of the pasting areas, wherein stereoscopic images have been pasted into respective ones of the plurality of pasting areas; and a second parallax-amount revising device (second parallax-amount revising means) for revising amounts of parallax of pasting areas with the exception of the pasting area that has been adjusted by the parallax-amount adjusting device from among the plurality of pasting areas in such a manner that a size relationship among parallax amounts in the plurality of pasting areas will be the same before and after the adjustment made by the parallax-amount adjusting device.

The apparatus further comprises a warning device (warning means) for issuing a warning when the difference between a parallax amount that has been defined for a stereoscopic image pasted by the image pasting device and a parallax amount that has been defined for a pasting area into which a stereoscopic image has been pasted is greater than a first threshold value.

Preferably, the apparatus further comprises a display control device (display control means) for controlling a display unit in such a manner that a pasting area, from among the plurality of pasting areas, for which has been defined a parallax amount for which the difference with respect to a parallax amount that has been defined for a stereoscopic image that will be pasted in this pasting area is less than a second threshold value, will be displayed differently from other pasting areas.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is an example of content that has been described in an XML file;

FIG. 11 is an example of content that has been described in an XML file;

FIG. 18 illustrates amounts of parallax;

DESCRIPTION OF THE PREFERRED EMBODIMENTS

Preferred embodiments of the present invention will be described in detail with reference to the drawings.

Figure 1:
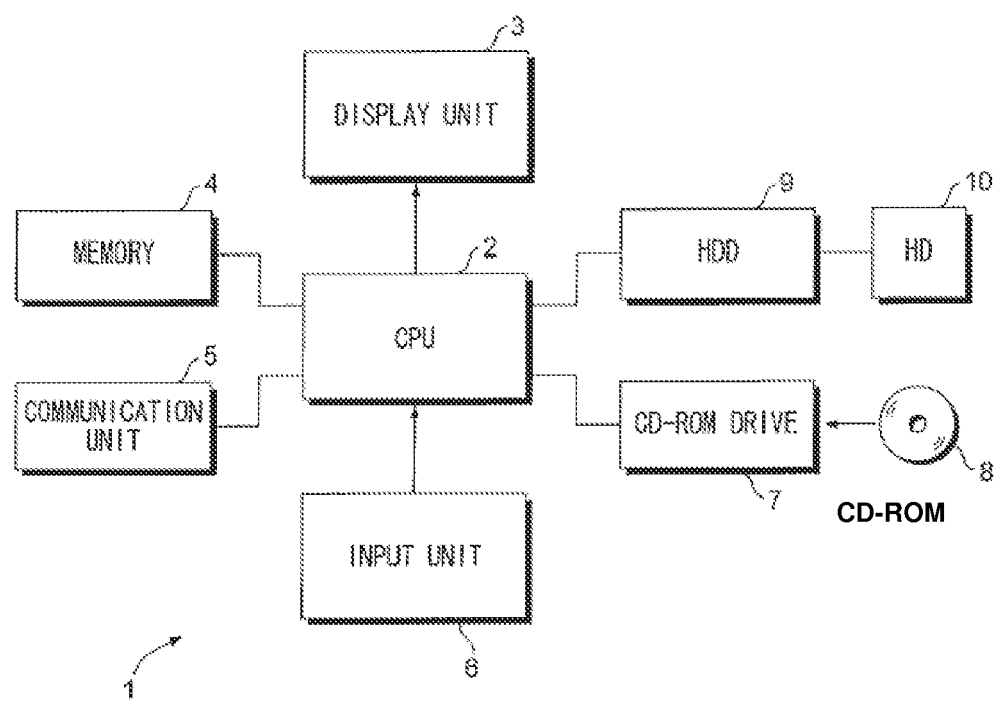
FIG. 1 is a block diagram illustrating the electrical configuration of a personal computer.

FIG. 1 is a block diagram illustrating the electrical configuration of a personal computer 1 according to an embodiment of the present invention. In this embodiment, the personal computer 1 communicates with a server computer (not shown) via the Internet. While communicating with the server computer, the user creates an electronic album using the personal computer 1. Naturally, the user can also generate an electronic album by utilizing a store terminal, which has been installed at a supermarket or convenience store, etc., without using the personal computer 1. In this case, the store terminal would have the electrical configuration shown in FIG. 1.

The overall operation of the personal computer 1 is controlled by a CPU 2.

The personal computer 1 includes a display unit 3, a memory 4, a communication unit 5 for communicating with a server computer, and an input unit 6 such as a keyboard and mouse. The personal computer 1 includes a hard disk 10 on which data such as image data representing a number of images has been recorded, and a hard-disk drive 9 for accessing the hard disk 10. The personal computer 1 further includes a CD-ROM drive 7 that accesses a CD-ROM 8 in which has been stored a program for controlling operation described below. The program that has been stored in the CD-ROM 8 is read by the CD-ROM drive 7 and the read program is installed in the personal computer 1, thereby allowing the personal computer 1 to operate in the manner described below. Naturally, it may be so arranged that even if the operation program is not stored on a recording medium such as the CD-ROM 8 removably inserted into the personal computer 1, the program can still be downloaded to the personal computer 1 via a network and installed in the personal computer 1.

Figure 2:
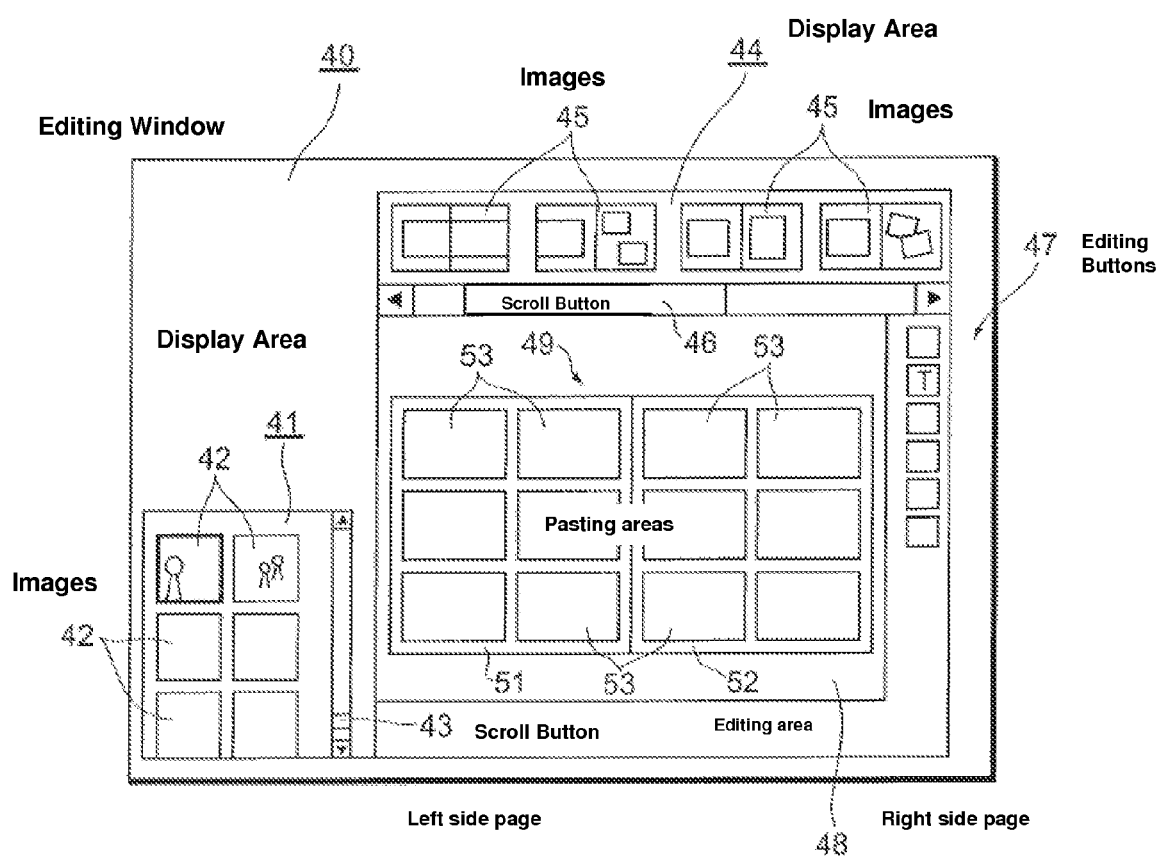
FIG. 2 is an example of a window for editing an electronic album.

FIG. 2 is an example of a window 40 for editing the electronic album.

Although processing for generating the electronic album will be described below, it will be assumed here that the personal computer 1 has already been connected to a server computer and that the electronic-album editing window 40 shown in FIG. 2 is being displayed on the display screen of the display unit 3 of the personal computer 1.

Formed at the lower-left portion of the editing window 40 is an image display area 41 in which images 42 to be pasted into the electronic album are displayed. The images (user images) 42 being displayed in the image display area 41 are represented by image data that has been stored on the hard disk 10. In a case where the electronic album is created using a store terminal, it goes without saying that the user brings a recording medium such as a memory card on which the image data has been recorded, reads the image data from the recording medium and displays the images, which are represented by the read image data, in the image display area 41. In such case the store terminal is provided with a memory card reader. A scroll button 43 is formed on the right side of the image display area 41. The scroll button 43 is moved freely up and down by a cursor (not shown). By moving the scroll button 43 up or down by the cursor, images that do not appear in the image display area 41 come into view in the image display area 41.

In this embodiment, stereoscopic images can be displayed in the electronic album, as will be described later in detail. The images 42 being displayed in the image display area 41 also are stereoscopic images.

Formed at the upper portion of the editing window 40 is a page display area 44 in which images 45 of pages constituting an electronic album are displayed. A scroll button 46 is formed beneath the page display area 44. The scroll button 46 also is freely movable to the left and right by a cursor (not shown). By moving the scroll button 46 to the left or right using the cursor, the images of pages that do not appear in the page display area 44 come into view in the page display area 44.

The editing area 48, which is for editing the pages that constitute the electronic album, is formed substantially over the entirety of the editing window 40. If the image of a desired page is selected (as by drag and drop) from among the images of the pages being displayed in the page display area 44, the image 49 of the selected page will be displayed in the editing area 48. Multiple (or a single) image compositing areas (pasting areas) 53 are defined in each of a left-side page 51 and right-side page 52 of the image 49 of the selected pages. (In a case where the left-side page 51 or right-side page 52 is considered individually, it can be construed as a single template that does not constitute an electronic album.) Images constituting the electronic album are pasted in the image compositing areas 53. For example, pasting of a desired image in a desired image compositing area 53 from among the images 42 being displayed in the image display area 41 is achieved by dragging and dropping the desired image in this image compositing area 53. (Naturally, since it will suffice if an image is selected for an image compositing area 53, etc., image selection may be performed such as by clicking and is not limited to drag-and-drop.) Formed on the right side of the editing window 40 are editing buttons 47 for synthesizing text, deleting images and subjecting images to a color conversion. As mentioned above, an image that is pasted in the image compositing area 53 is a stereoscopic image.

Figure 3:
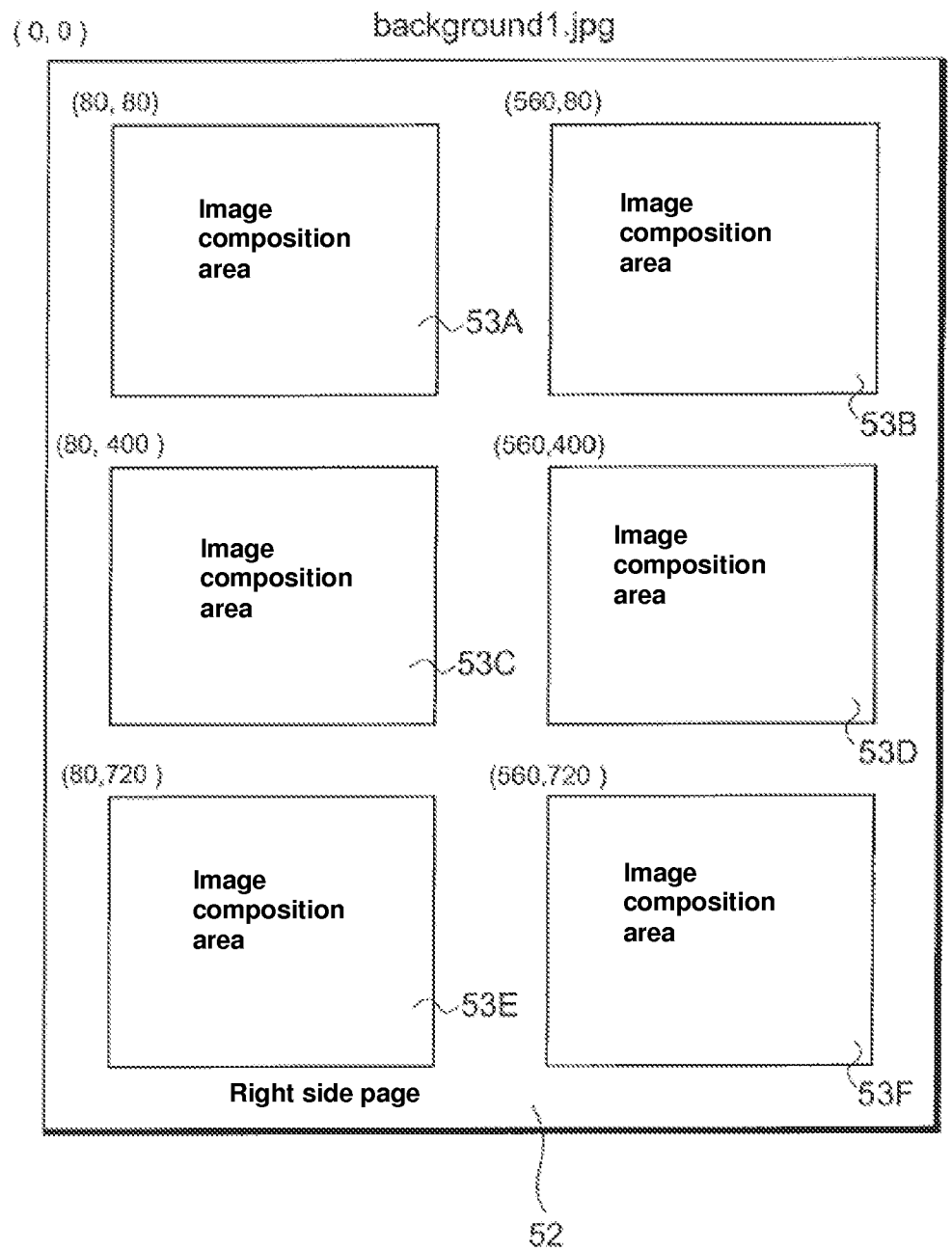
FIG. 3 is an example of an image of a page constituting an electronic album.

FIG. 3 illustrates the right-side page 52, which is being displayed in the editing area 48 of the editing window 40, in a form enlarged in comparison with FIG. 2.

The page 52 constituting the electronic album has been assigned "background1.jpg" as a file name. The page 52 is specified by this file name. Six image compositing areas 53A to 53F have been formed on the page 52 constituting the electronic album, as mentioned above. Images are pasted in respective ones of these image compositing areas 53A to 53F. In particular, in this embodiment, stereoscopic images are pasted in the image compositing areas 53A to 53F. The user can thus produce an electronic album of stereoscopic images.

The image compositing areas 53A to 53F all have a size of 320 pixels in the width direction and 240 pixels in the height direction. Naturally, the size of the image compositing areas may differ from page to page, and the sizes of the image compositing areas that have been formed on the same page may be different. If we let (0,0) represent the coordinates of the upper-left corner of page 52, then the upper-left origins of first image compositing area 53A, second image compositing area 53B, third image compositing area 53C, fourth image compositing area 53D, fifth image compositing area 53E and sixth image compositing area 53F will be (80,80), (560,80), (80,400), (560,400), (80,720) and (560,720), respectively.

FIG. 4 illustrates content that has been stored in an XML (eXtensible Markup Language) file.

The first line declares that the document described in this XML file is based upon xml and that character encoding is in the utf-8 format. The second line indicates that the content described in this XML file regards a file having the file name "background1.jpg". The content illustrated in FIG. 4 concerns the image of the page 52 shown in FIG. 3. The third and tenth lines are root nodes. The fourth to ninth lines define the contents of the image compositing areas that have been formed on the page 52 represented by the file having the file name of the second line. Here "picture id" is identification data of the image compositing areas 53A to 53F, in which 1, 2, 3, 4, 5 and 6 of "picture id" represent the image compositing areas 53A, 53B, 53C, 53D, 53E and 53F, respectively. Further, "left" indicates the X-coordinate positions of the upper-left origins of the image compositing areas 53A to 53F on the page 52, "top" indicates the Y-coordinate positions of the upper-left origins of the image compositing areas 53A to 53F on the page 52, "width" indicates the width of each of the image compositing areas 53A to 53F, "height" indicates the height of each of the image compositing areas 53A to 53F, and "3d" indicates, in the form of a percentage (%), the amount of pop-up (amount of parallax of a stereoscopic image) in a case where stereoscopic images have been pasted in the respective image compositing areas 53A to 53F.

If a stereoscopic image is pasted in the first image compositing area 53A, the amount of parallax of this stereoscopic image will be 5% of the width. Similarly, the amounts of parallax of the second image compositing area 53B, third image compositing area 53C, fourth image compositing area 53D, fifth image compositing area 53E and sixth image compositing area 53F will be 5%, 15%, 15%, 5% and 5% of the widths, respectively. In this embodiment, as mentioned above, an amount of parallax is defined for every image compositing area 53, and the amount of parallax of the stereoscopic image that has been pasted in each image compositing area is changed so as to become this defined amount of parallax (even though an amount of parallax has been defined for the stereoscopic image).

The image file representing the page and the XML file corresponding to this image file have been stored on the hard disk 10. Rather than defining an amount of parallax for every image compositing area, an amount of parallax may be defined for every page. In such case an XML file in which an amount of parallax for every page has been described would be stored.

Figure 5A:
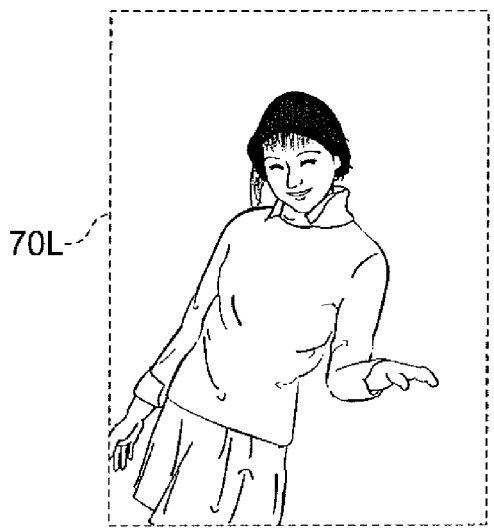
FIGS. 5A and 5B illustrate a left-eye image and a right-eye image, respectively.
Figure 5B:

FIG. 5A illustrates a left-eye image 70L and FIG. 5B illustrates a right-eye image 70R.

In a case where a stereoscopic image is displayed, the left-eye image 70L, which is observed by the left eye of the observer, and the right-eye image 70R, which is observed by the right eye of the observer, are required. In this embodiment, therefore, the left-eye image 70L and right-eye image 70R have been stored beforehand as the images desired to be displayed in the form of a stereoscopic image in the image compositing area.

Figure 6:
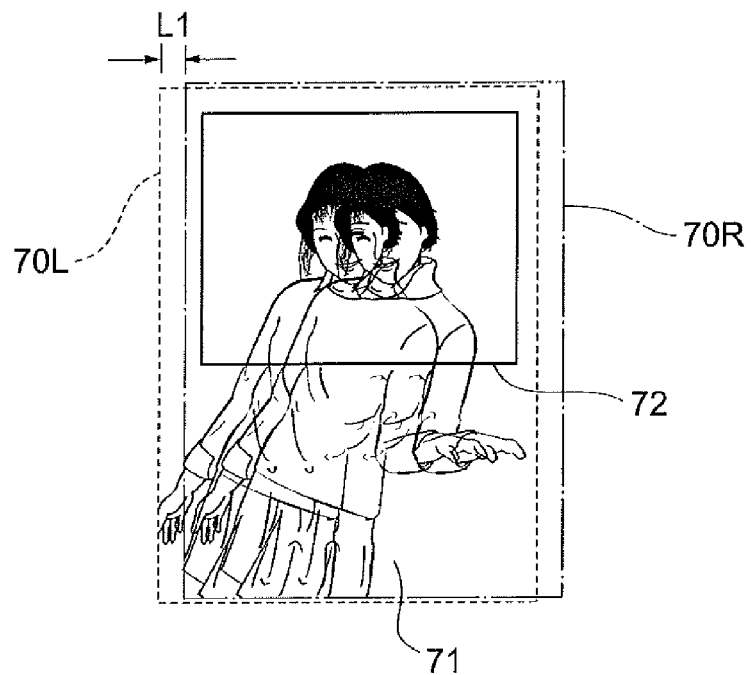
FIGS. 6 and 7 illustrate examples of stereoscopic images.

FIG. 6 illustrates a stereoscopic image having an amount of parallax that has been defined for this stereoscopic image.

If the left-eye image 70L and right-eye image 70R are superimposed, then the observer can view a portion 71, where the two images have been superimposed, as a stereoscopic image. In this embodiment, an image portion within a zone 72 contained in the superimposed image portion 71 and having the same size as that of the image compositing area is displayed in the image compositing area. The image displayed in the image compositing area 53 appears as a stereoscopic image.

A parallax amount L1 is defined for the stereoscopic image at the time of image capture. Normally, the stereoscopic image having the parallax amount L1 is displayed. In this embodiment, however, a parallax amount has been defined for an image compositing area (or for the page), as mentioned above, and a stereoscopic image having the parallax amount that has been defined for this image compositing area, not the parallax amount L1 at the time of capture, is displayed.

Figure 7:
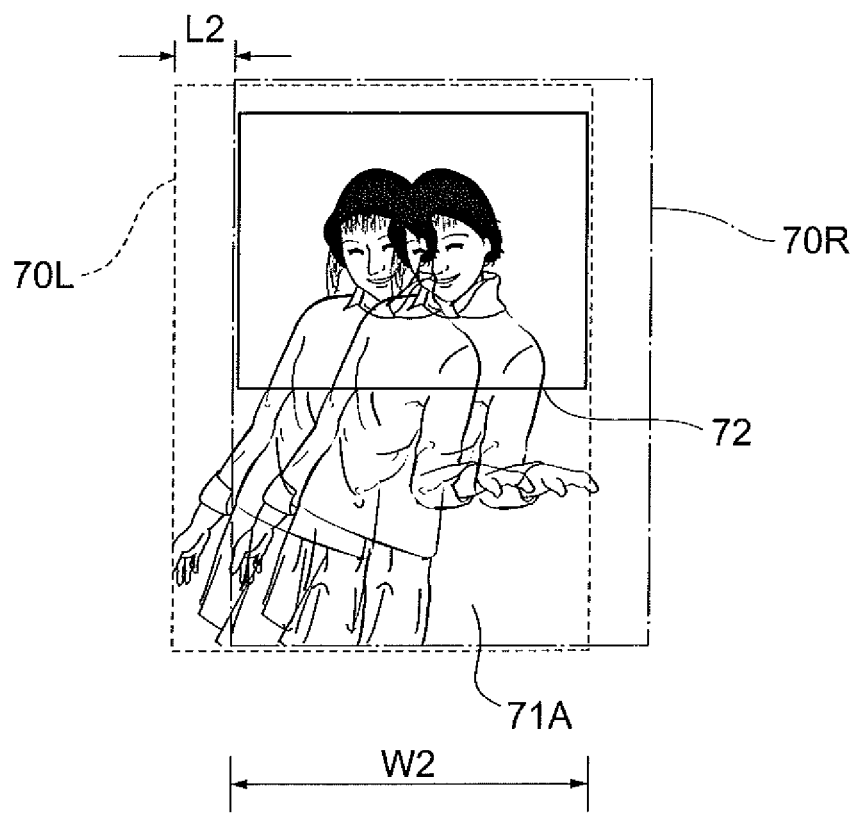

FIG. 7 is an example of a stereoscopic image having an amount of parallax that has been defined for an image compositing area.

Let a parallax amount L2 be the amount of parallax that has been defined for an image compositing area in which a stereoscopic image will be pasted. Even though the amount of parallax that has been defined for the stereoscopic image is L1, as shown in FIG. 6, by pasting this stereoscopic image in the image compositing area, a stereoscopic image having the parallax amount L2 that has been defined for the image compositing area is displayed.

Figure 8:
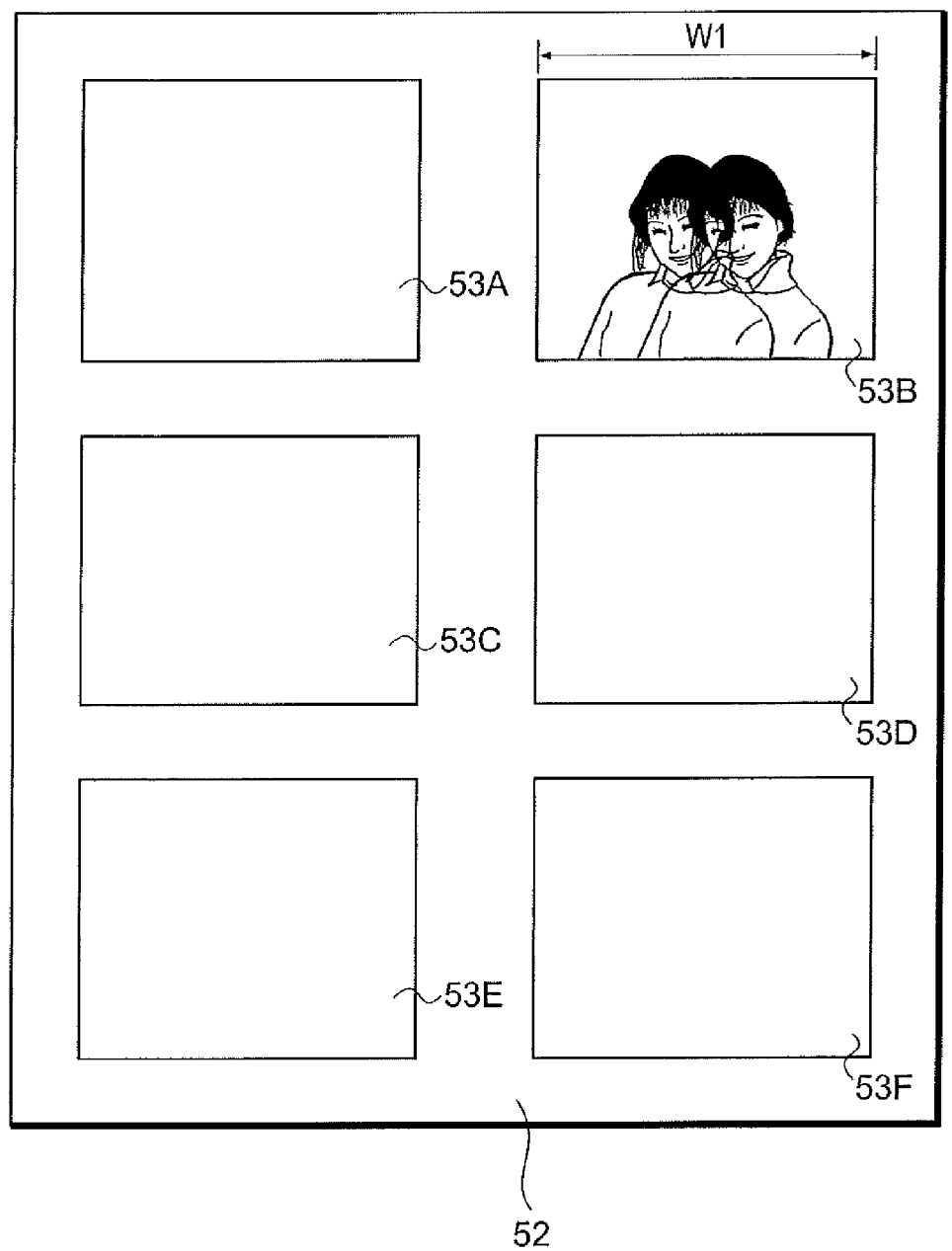
FIG. 8 is an example of an image of a page constituting an electronic album.

FIG. 8 is an example of a stereoscopic image that has been pasted on the page 52.

Assume that the stereoscopic image has been pasted in the second image compositing area 53B. If the parallax amount L2 has been defined for the second image compositing area 53B, then even though the parallax amount that was defined for the stereoscopic image was L1, a stereoscopic image having the parallax amount L2 (see FIG. 7) is displayed in the second image compositing area 53B.

Figure 9:
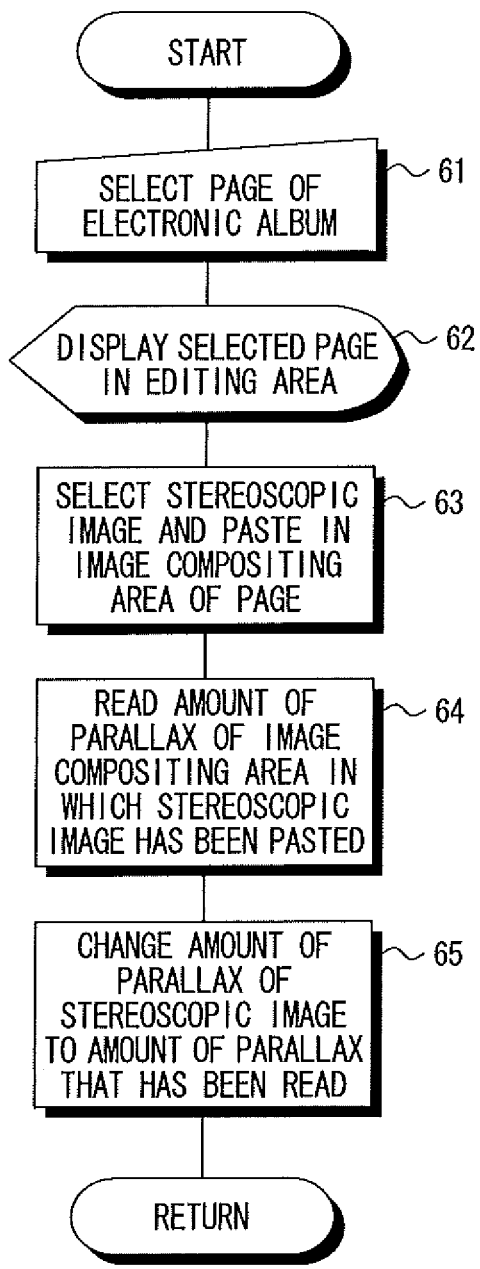
FIG. 9 is a flowchart illustrating processing for generating an electronic album.

FIG. 9 is a flowchart illustrating processing for generating an electronic album.

As mentioned above, a desired page is selected from among the images 45 of pages being displayed in the page display area 44 (step 61). The page selected is displayed in the editing area 48 (step 62).

A stereoscopic image to be pasted on the page displayed in the editing area 48 is selected from among the images 42 being displayed in the image display area 41, and this stereoscopic image is pasted in an image compositing area that has been formed on the page (step 63). The amount of parallax that has been defined for the image compositing area in which this stereoscopic image has been pasted is read from the XML file that corresponds to the image file of the page on which this image compositing area has been formed (step 64). The amount of parallax of the stereoscopic image pasted in the image compositing area is changed from the amount of parallax that has been defined for this stereoscopic image to the amount of parallax that has been defined for the image compositing area (step 65).

In the embodiment described above, an image compositing area has been formed on a page. When a stereoscopic image is pasted in this formed image compositing area, a stereoscopic image having the amount of parallax that has been defined for this image compositing area is displayed. By contrast, in an embodiment described next, image compositing areas in which stereoscopic images will be pasted are not defined for a page, and the user pastes a stereoscopic image at a preferred position.

Figure 10:
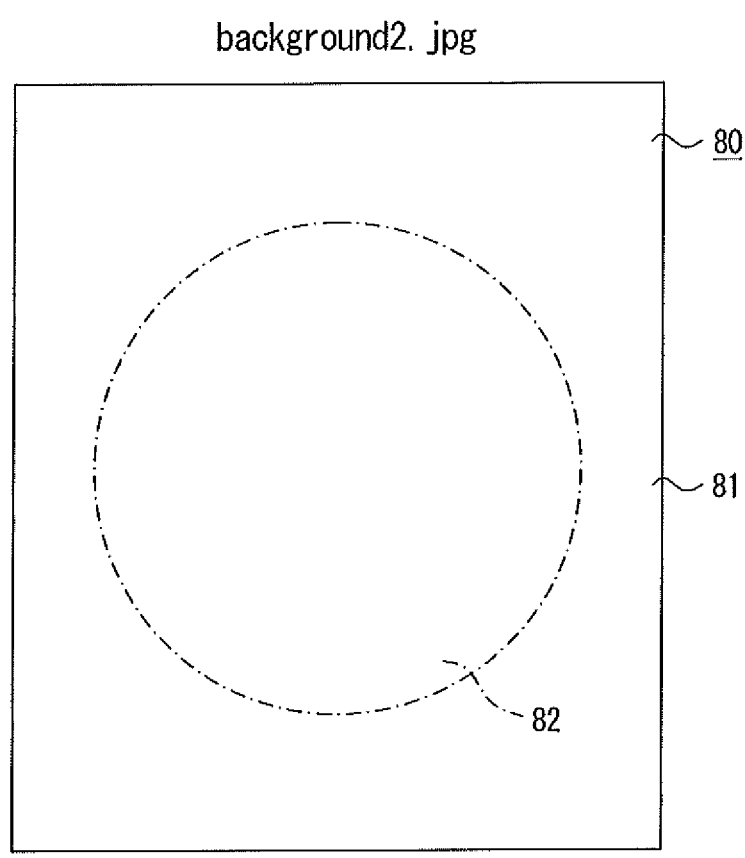
FIG. 10 is an example of an image of a page constituting an electronic album.

FIG. 10 is an example of a page constituting a electronic album. (It goes without saying that although the page can be considered a single template that does not constitute an electronic album, a plurality of images are pasted in a case where the page is considered a single template.)

A page 80 has been assigned "background2.jpg" as a file name. Stipulated for the page 80 are an area 82 that makes the amount of parallax relatively large and an area 81 that makes the amount of parallax relatively small. A border defining the area 82 may or may not be displayed. These areas 81 and 82 can also be considered pasting areas (image compositing areas) in which stereoscopic images are pasted.

When a stereoscopic image is pasted in the area 82, the amount of parallax thereof is enlarged in comparison with a case where a stereoscopic image is pasted in the area 81 [e.g., the amount of parallax is made 10% of the width of the stereoscopic image (the superimposed portion)]. Conversely, when a stereoscopic image is pasted in the area 81, the amount of parallax thereof is reduced in comparison with a case where a stereoscopic image is pasted in the area 82 (e.g., the amount of parallax is made 5% of the width of the stereoscopic image).

FIG. 11 illustrates content that has been described in an XML file corresponding to the page 80 shown in FIG. 10.

The first line declares that the document described in this XML file is based upon xml and that character encoding is in the utf-8 format, in a manner similar to the declaration described in the XML file shown in FIG. 4. The second line indicates that the content described in this XML file regards a file having the file name "background2.jpg". The content illustrated in FIG. 11 concerns the page 80 shown in FIG. 10. The third, sixth and eighth lines are root nodes. The fourth line stipulates that the amount of parallax of the circular area 82 (area id=1) is 10% of the width of a pasted stereoscopic image. The fifth line indicates that X and Y coordinates of the center of the circular area 82 are (110,100) (pixels) and that the diameter thereof is 60 (pixels). The seventh line stipulates that the amount of parallax of the area 81 (area id=2) outside the circular area 82 is 5% of a width of the pasted stereoscopic image.

By describing the XML file in this manner, the amount of parallax can be changed in accordance with the position where a stereoscopic image is pasted, as mentioned above.

Figure 12:
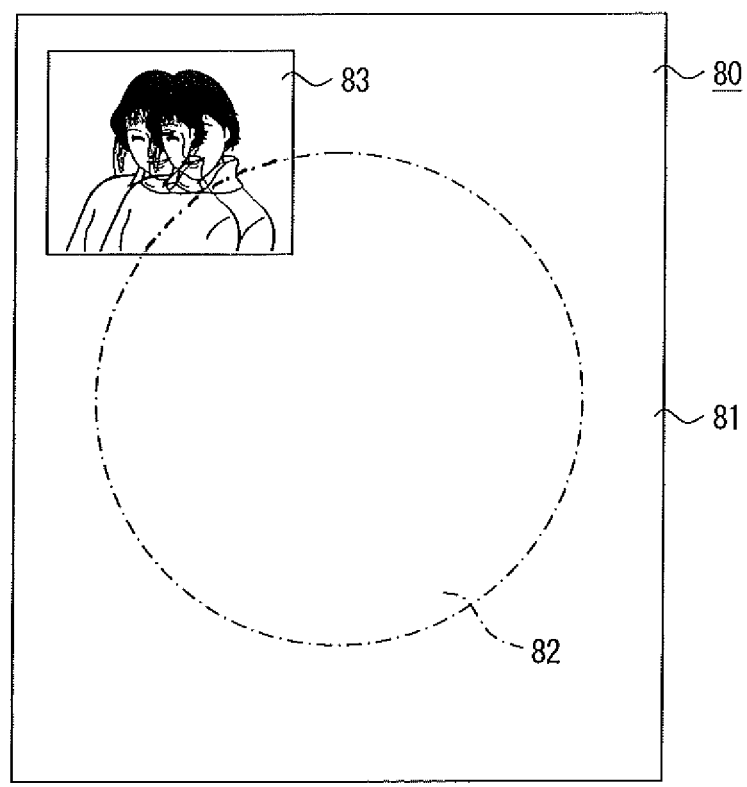
FIGS. 12 to 17 are examples of images of pages constituting an electronic album.
Figure 13:
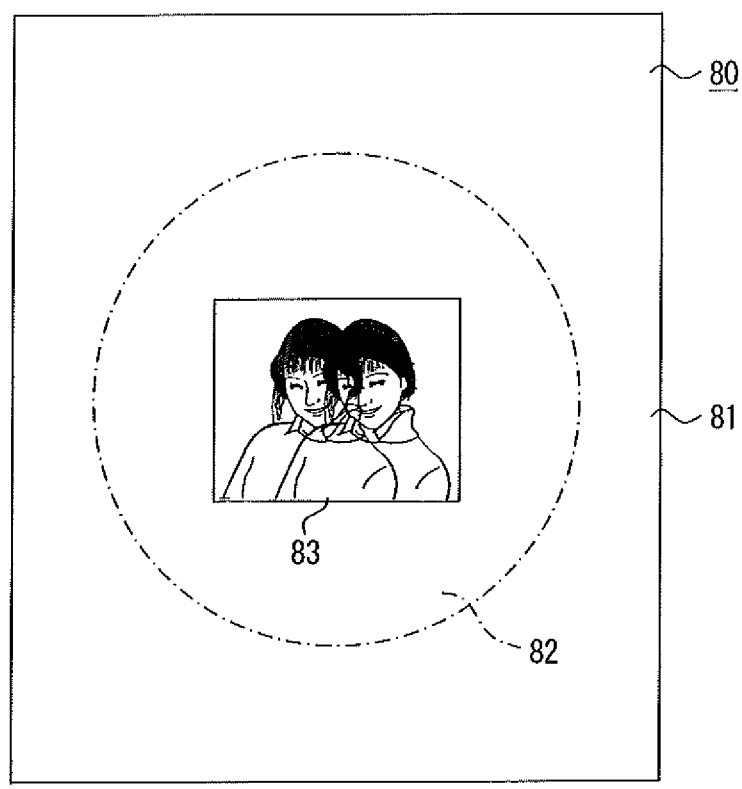

FIGS. 12 and 13 illustrate the manner in which stereoscopic images are pasted.

In this embodiment, it is determined in which of the areas 81, 82 more than half of the area of a stereoscopic image 83 pasted on page 80 falls. The amount of parallax that has been defined for the area (81 or 82) in which more than half of the area of stereoscopic image 83 exists is adopted as the amount of parallax of the stereoscopic image 83.

In a case where more than half of the area of stereoscopic image 83 pasted on the page 80 falls within the area 81, as shown in FIG. 12, the amount of parallax of the stereoscopic image 83 is made the comparatively small amount of parallax that has been defined for the area 81.

In a case where more than half of the area of stereoscopic image 83 pasted on the page 80 falls within the area 82, as shown in FIG. 13, the amount of parallax of the stereoscopic image 83 is made the comparatively large amount of parallax that has been defined for the area 82.

It may be so arranged that rather than deciding the amount of parallax in accordance with into which of the areas 81, 82 more than half of the area of the stereoscopic image 83 falls, the amount of parallax is changed gradually in accordance with moving of the stereoscopic image 83 from area 81 to area 82 or from area 82 to area 81. Specifically, it may be so arranged that the percentage of the amount of parallax is changed in accordance with the percentage of the area of stereoscopic image 83 that falls within area 81 or 82. For example, if the percentage of the area of stereoscopic image 83 that falls within area 81 and the percentage of the area of stereoscopic image 83 that falls within area 82 is in a ratio of 2:1, then the amount of parallax is decided in such a manner that the percentage of the amount of parallax of area 81 and the percentage of the amount of parallax of area 82 will take on a ratio of 2:1. [In this case, the amount of parallax is (10×2+5)/3 or about 8%].

Figure 14:
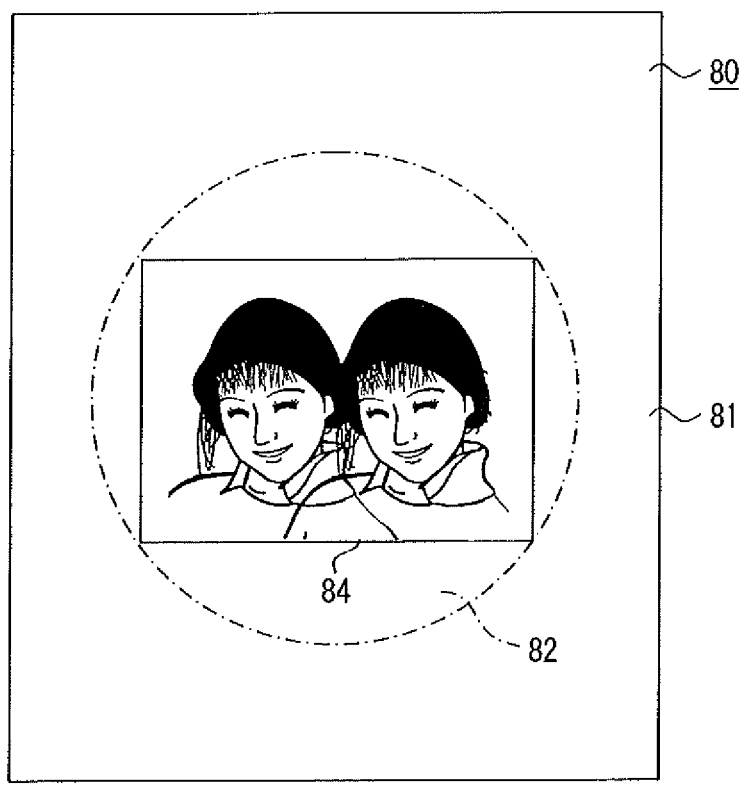

FIG. 14 illustrates the manner in which a stereoscopic image 84 has been pasted on page 80.

Thus, the amount of parallax of a stereoscopic image is changed so as to have an amount of parallax that has been defined for the area 82. However, there are also cases where a range over which the amount of parallax of a stereoscopic image is adjustable is defined. (Such range would be recorded in the header of the image file representing the stereoscopic image.) In a case where the amount of parallax that has been defined for the area 82 (and similarly with regard also to image compositing area 53 and area 81) exceeds the range over which the amount of parallax of the stereoscopic image is adjustable, the stereoscopic image can also be enlarged in size so as to take on the amount of parallax that has been defined for area 82. A representation of the stereoscopic image 84 thus enlarged in size is shown in FIG. 14. By enlarging the right-eye image 70R and the left-eye image 70L constituting the stereoscopic image, as shown in FIG. 6 or 7, the stereoscopic image is enlarged in size.

Figure 15:
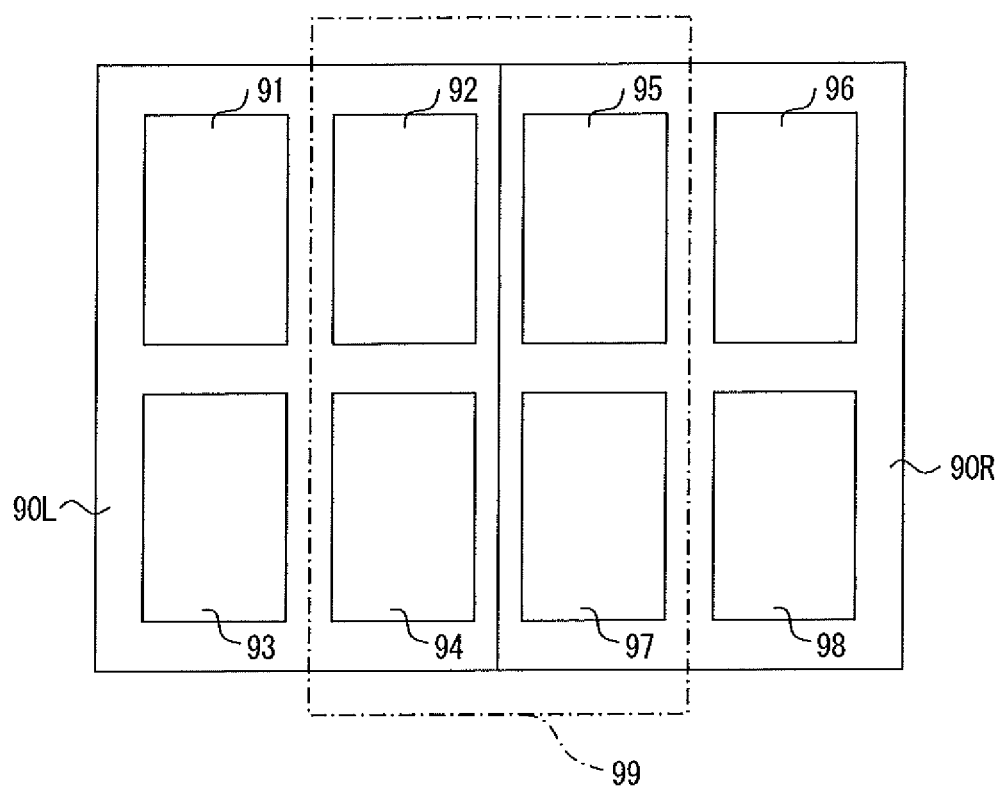

FIG. 15 illustrates another embodiment and shows an example of left and right pages 90L and 90R, respectively, of a left-right spread. This embodiment is such that in the case of pages of a spread, the amount of parallax of image compositing areas at the central portion of the spread is increased.

XML files corresponding to respective ones of the pages 90L and 90R also have been stored. It may of course be so arranged that the two pages of the spread are represented by a single image file and a single XML file is stored so as to correspond to this single image file.

Image compositing areas 91 to 94 have been formed in two rows and two columns on the left page 90L. Similarly, image compositing areas 95 to 98 have been formed in two rows and two columns on the right page 90R. These image compositing areas 91 to 98 are identical in size and shape.

Amounts of parallax that have been defined for the image compositing areas 92, 94, 95 and 97 formed on the inner sides of the left page 90L and right page 90R (the central portion of the spread) so as to be enclosed in a zone 99 have been defined as being "large" (e.g., 15% of the width of the image compositing areas 91 to 98). Amounts of parallax that have been defined for the image compositing areas 91, 93, 96 and 98 formed on the outer sides of the left page 90L and right page 90R have been defined as being "small" (e.g., 5% of the width of the image compositing areas 91 to 98).

If stereoscopic images are pasted in the image compositing areas 92, 94, 95 and 97 on the inner side, their amount of parallax increases. If stereoscopic images are pasted in the image compositing areas 91 to 98 on the outer side, their amount of parallax decreases. Since the amount of parallax of the stereoscopic images displayed on the inner side of the spread pages increases, the stereoscopic image are comparatively easy to view when the electronic album is viewed.

Figure 16:
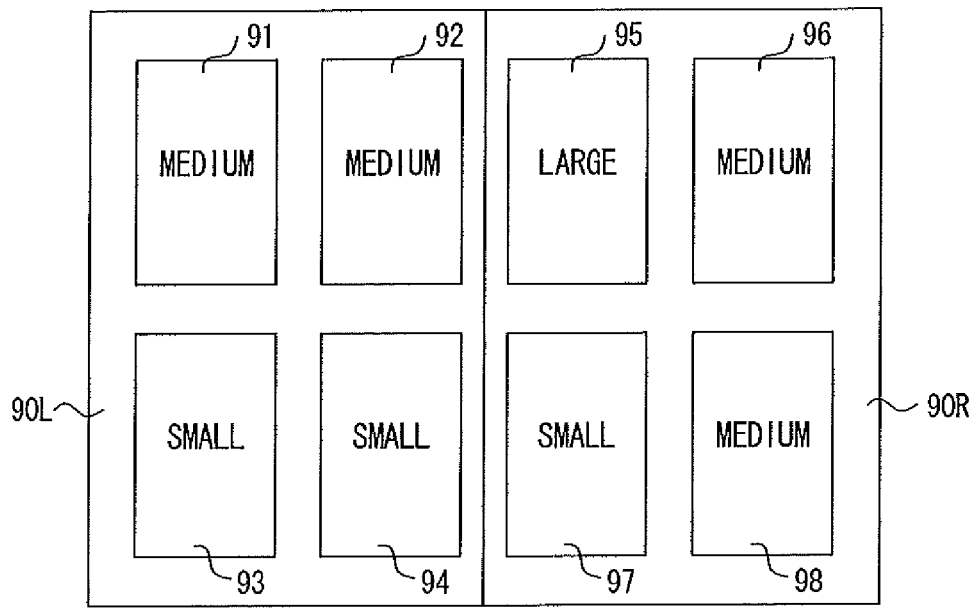
Figure 17:
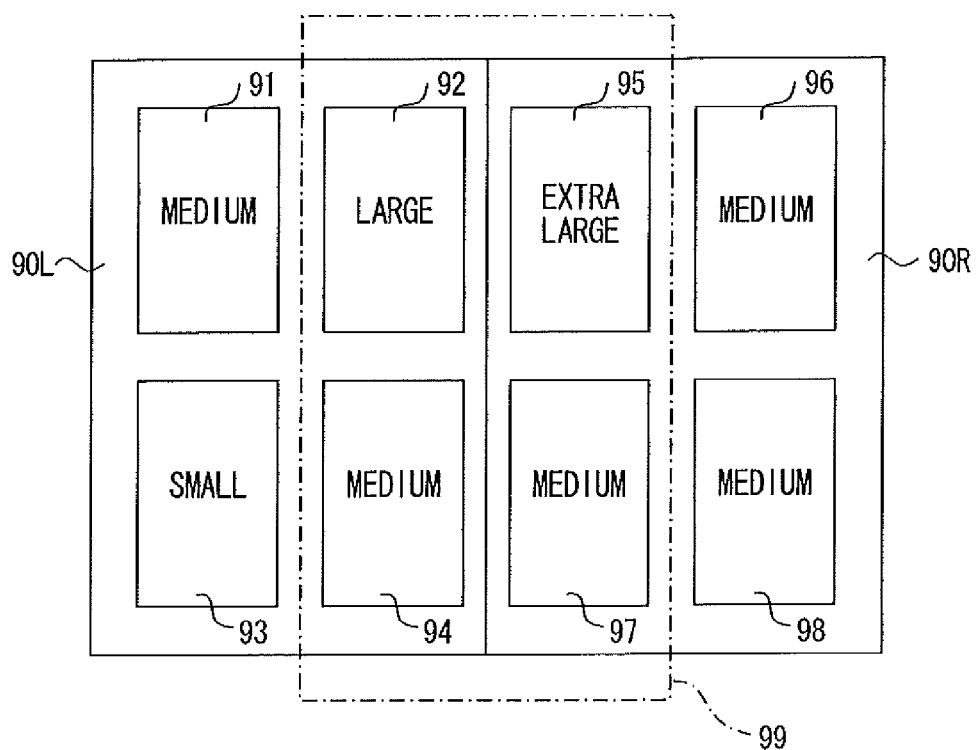

FIGS. 16 and 17 illustrate a modification and show the left and right pages 90L and 90R, respectively.

With reference to FIG. 16, an amount of parallax has been defined for each of the image compositing areas 91 to 98. The characters reading "LARGE", "MEDIUM" and "SMALL" in the image compositing areas 91 to 98 indicate the extent of amount of parallax. The amount of parallax of the image compositing areas 91, 92, 96 and 98 is "MEDIUM", the amount of parallax of the image compositing areas 93, 94 and 97 is "SMALL" and amount of parallax of the image compositing area 95 is "LARGE".

FIG. 18 illustrates the definition of amount of parallax.

If the amounts of horizontal offset between a left-eye image and a right-eye image that form a stereoscopic image are 5%, 10% and 15% of the width of the image compositing area, then the amounts of parallax are "SMALL", "MEDIUM" or "LARGE", respectively. If the width of the image compositing area is 1000 pixels, then the amounts of horizontal offset of 5%, 10% and 15% are 50 pixels, 100 pixels and 150 pixels, respectively.

With reference to FIG. 17, consider amounts of parallax of the inner-side image compositing areas 92, 94, 95 and 97 enclosed in zone 99 in a case where amounts of parallax have been defined for the image compositing areas 91 to 98. An amount of parallax is added onto these amounts of parallax, which have been defined for the image compositing areas 92, 94, 95 and 97, taking into consideration the fact that these image compositing areas are on the inner side of the pages. (This is a first parallax-amount revision.) As a result, the amounts of parallax of the image compositing areas 92, 94, 95 and 97 are leveled up. The amount of parallax of the image compositing area 92 thus changes from "MEDIUM" to "LARGE", the amount of parallax of the image compositing areas 94 and 97 changes from "SMALL" to "MEDIUM" and the amount of parallax of the image compositing area 95 changes from "LARGE" to "EXTRA LARGE". By way of example, the "EXTRA LARGE" amount of parallax means an amount of offset that is 20% of the width of the image compositing area 95.

Thus, the amount of parallax is enlarged with regard to the image compositing areas 92, 94, 95 and 97 at the central portion of the spread pages 90L and 90R. The amount of parallax may be represented by number of pixels rather than by "LARGE", "MEDIUM", "SMALL". In a case where the amount of parallax is enlarged, an amount of parallax that is a fixed value may be added or multiplication may be performed at a numeric scaling factor that is greater than 1. Furthermore, it may be so arranged that in a case where image compositing areas have been formed not on the pages of a left-right spread but on the pages of an upper-lower spread or on only one page of left and right pages or of upper and lower pages, the amount of parallax of the image compositing areas formed at the central portion is enlarged. Furthermore, it may be so arranged that even in a case where image compositing areas have not been defined, as shown in FIGS. 10 to 14, the amount of parallax of a stereoscopic image is enlarged in similar fashion if the stereoscopic image has been pasted at a portion near the spread (i.e., the portion near the center when the pages are spread).

Figure 19:
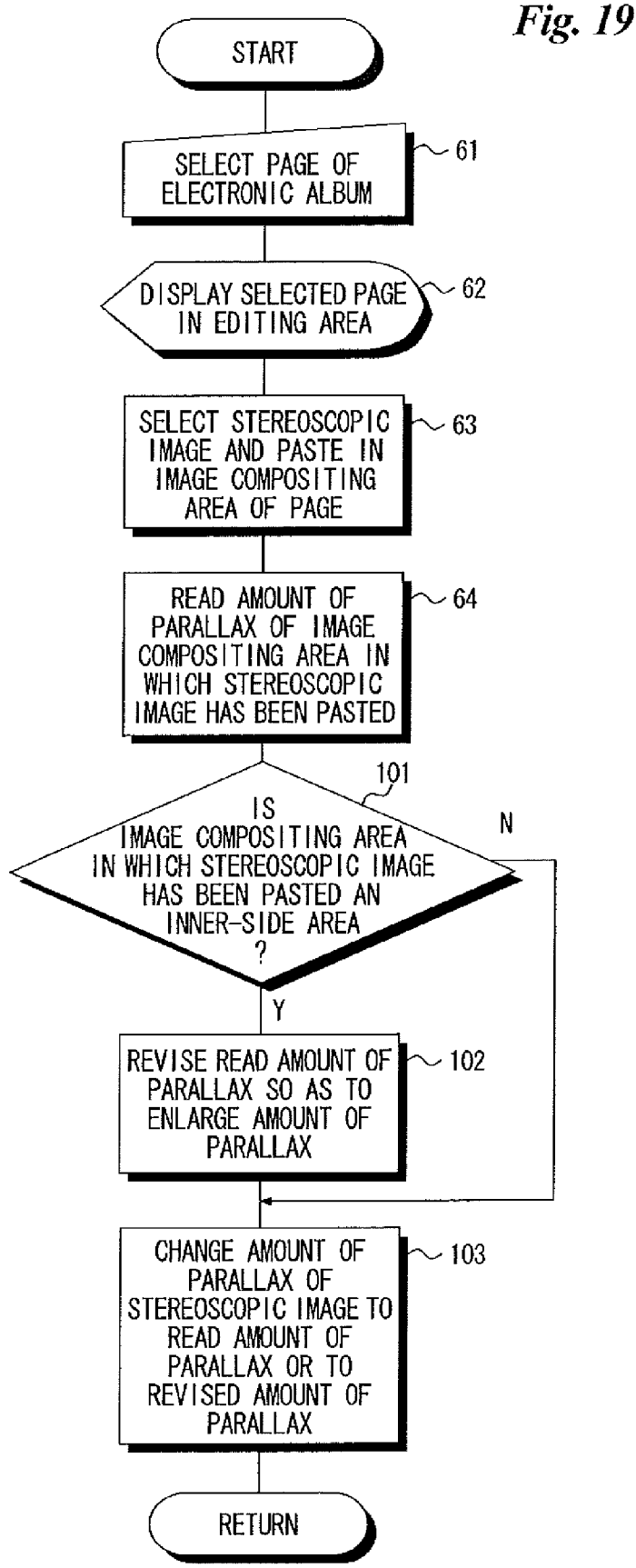
FIG. 19 is a flowchart illustrating processing for generating an electronic album.

FIG. 19 is a flowchart illustrating processing for generating an electronic album. Processing steps in FIG. 19 identical with those shown in FIG. 9 are designated by like step numbers and need not be described again. This embodiment is such that the amount of parallax is enlarged in a case where a stereoscopic image is pasted in a image compositing area on the inner side of spread pages.

Assume that a page of a spread has been selected (step 61) and is displayed in the editing area 48. A stereoscopic image is pasted in an image compositing area that has been formed on the page (step 63). It is determined whether the image compositing area in which the stereoscopic image has been pasted is an area on the inner side (i.e., whether it is an image compositing area inside the zone 99 as mentioned earlier) (step 101).

If the image compositing area is an area on the inner side ("YES" at step 101), then the amount of parallax is revised (by the first parallax-amount revision) so as to exceed the amount of parallax that has been defined for the image compositing area (step 102). If the amount of parallax that has been defined for the image compositing area is "MEDIUM", then the amount of parallax is revised to "LARGE", as mentioned above. The other amounts of parallax are similarly revised. If the image compositing area is not an area on the inner side ("NO" at step 101), then the processing of step 102 is skipped.

The amount of parallax of the stereoscopic image that has been pasted in the image compositing area is changed to the amount of parallax revised at step 102 or to the amount of parallax read at step 64 (step 103).

In the foregoing embodiment, it may be so arranged that in a case where the amount of parallax of a stereoscopic image that has been pasted in a desired image compositing area from among the image compositing areas 91 to 98 has been adjusted by the user (using parallax-amount adjusting means), the amount of parallax of image compositing areas other than the image compositing area in which has been pasted the stereoscopic image whose amount of parallax has been adjusted is similarly revised. (This is a third parallax-amount revision.) For example, if the amount of parallax of a stereoscopic image that has been pasted in a certain image compositing area is multiplied by a factor of 1.1, then the amount of parallax of stereoscopic images that have been pasted in the other image compositing areas also is multiplied by a factor of 1.1.

Figure 20:
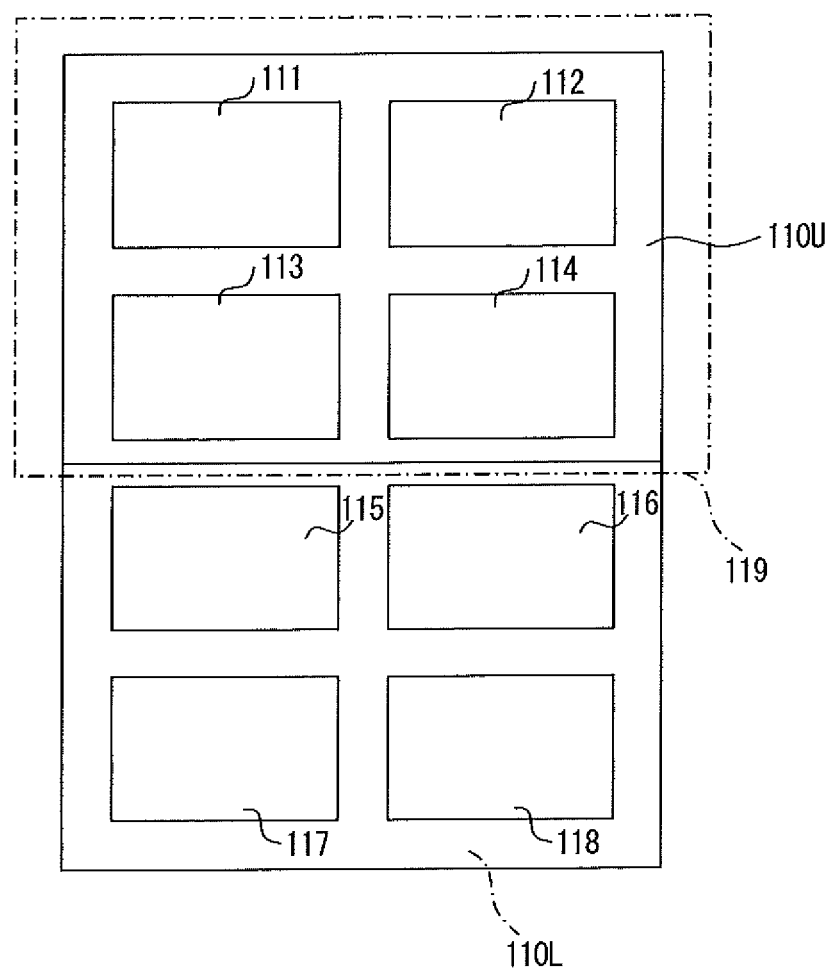
FIG. 20 is an example of an image of pages constituting an electronic album.

FIG. 20 illustrates a modification and shows an example of the pages of an upper-lower spread.

Image compositing areas 111 to 114 have been formed in two rows and two columns on an upper-side page 110U, and image compositing areas 115 to 118 have been formed in two rows and two columns on a lower-side page 110L. Amounts of parallax have been set for each of these image compositing areas 115 to 118 in the manner described above.

The amounts of parallax are revised in such a manner that they will exceed the amounts of parallax that have been defined for the image compositing areas 111 to 114 formed on the upper-side page 110U and enclosed in a zone 119.

Thus, it may be so arranged that the amount of parallax is enlarged (or reduced) not only on the inner side of a spread page but also at any image compositing area or portion where a stereoscopic image has been pasted.

The zones 99, 119 that enlarge the amount of parallax in the foregoing embodiment may be defined in XML files and may be stored in the header of the file representing the page.

Further, it goes without saying that the image compositing areas 91 to 98 and 111 to 118 may be described in an XML file that corresponds to the page in a manner similar to that shown in FIG. 4.

Figure 21:
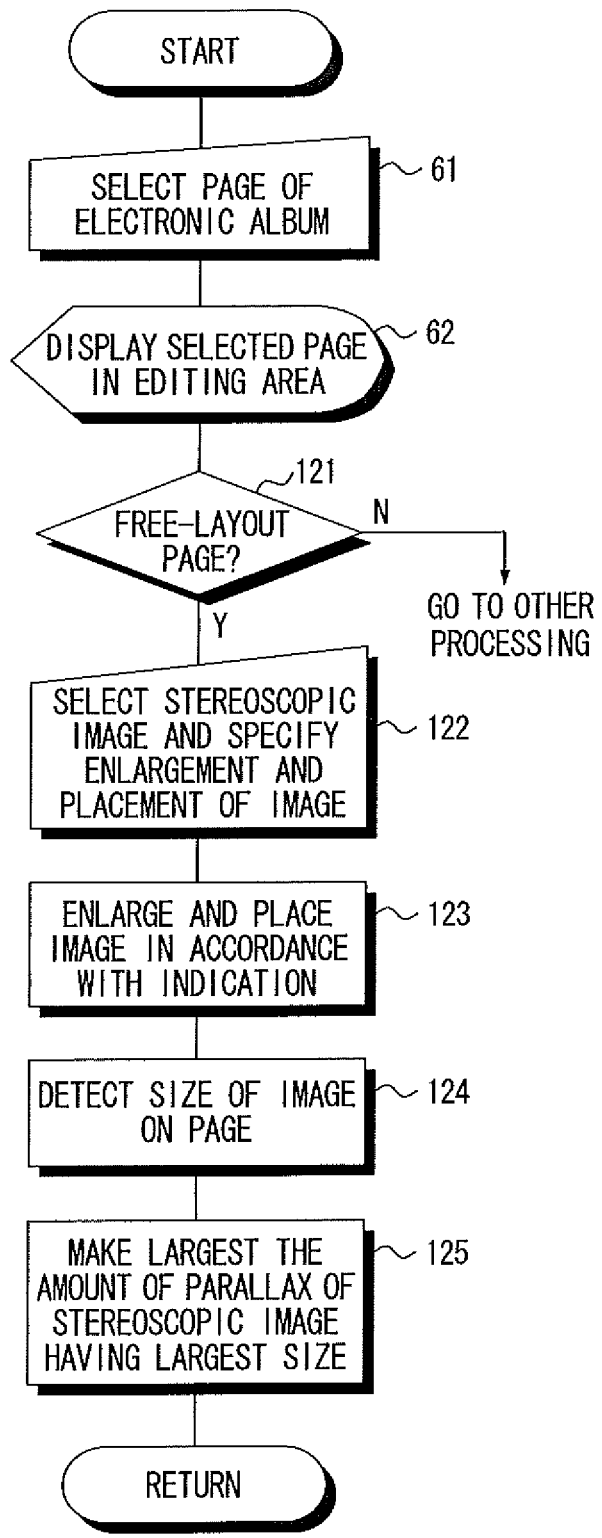
FIG. 21 is a flowchart illustrating processing for generating an electronic album.
Figure 22:
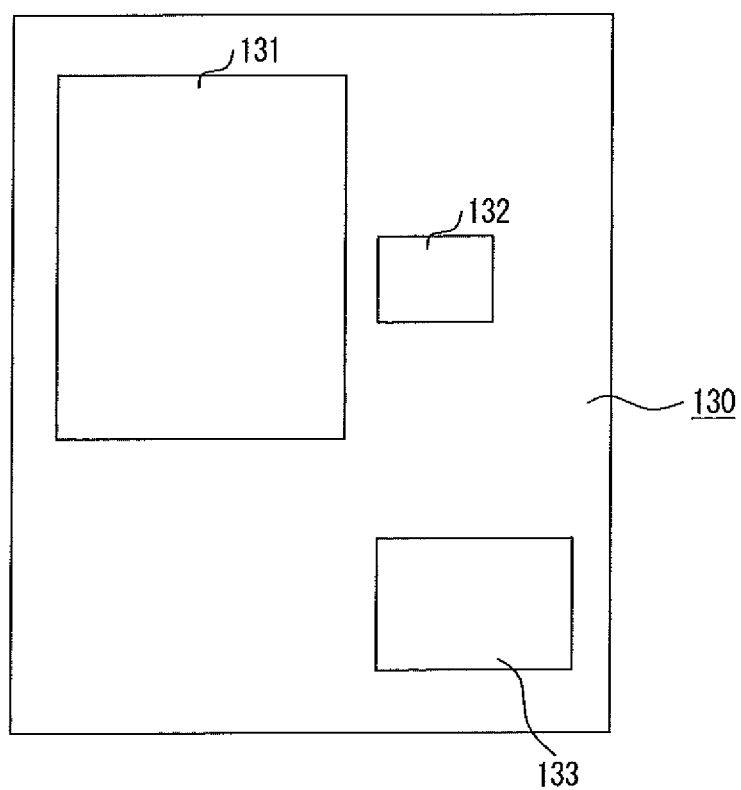
FIG. 22 is an example of an image of a page constituting an electronic album.

FIGS. 21 and 22 illustrate another embodiment. This embodiment changes amount of parallax in accordance with the pasting position of a stereoscopic image.

The page of the electronic album is selected (step 61) and the selected page is displayed in the editing area (step 62). Next, it is determined whether the selected page is a page of a free layout (step 121). If the selected page is not the page of a free layout ("NO" at step 121), other processing, e.g., the processing from step 63 onward in FIG. 9, is executed.

If the selected page is the page of a free layout ("YES" at step 121), a stereoscopic image is selected and the user indicates enlargement and placement of the selected stereoscopic image (step 122). Enlargement and placement of the stereoscopic image are carried out in accordance with this instruction (step 123). In a case where a plurality of stereoscopic images are pasted on the free-layout page, enlargement and placement, etc., of stereoscopic images are repeated.

When placement of the stereoscopic image ends, the sizes of the stereoscopic images that have been pasted on the free-layout page are detected (step 124). The amount of parallax that has been defined for the overall page of the free layout is read from the XML file that corresponds to the page of the free layout. The amount of parallax of the stereoscopic images is changed to the amount of parallax that has been read. Thereafter, the amount of parallax of the stereoscopic images is revised in such a manner that the amount of parallax of the stereoscopic image having the largest size will be the largest (step 125). (This is a second parallax-amount revision.)

FIG. 22 is an example of a page on which stereoscopic image have been pasted. (This page can be considered a single template.)

Stereoscopic images 131, 132 and 133 have been pasted on a page 130. The stereoscopic image having the large size is the stereoscopic image 131. Accordingly, the amount of parallax of the stereoscopic image 131 is made the largest. The amount of parallax of the stereoscopic image 132, which is closest to the stereoscopic image 131 of largest size, is made the next largest, and the amount of parallax of the stereoscopic image 133, which is farthest from the stereoscopic image 131, is made the smallest. For example, if the amount of parallax that has been defined for the free-layout page is 5% of the width of the page, then the amounts of parallax of the stereoscopic images 131, 132 and 133 will be 7%, 4% and 2%, respectively, of the width of the page, by way of example.

In the foregoing embodiment, the stereoscopic image having the largest size among the plurality of stereoscopic images that have been pasted on the same page takes on the largest amount of parallax. As for the other stereoscopic images, the closest they are to the stereoscopic image of largest size, the larger their amount of parallax becomes. However, it may be so arranged that amount of parallax is decided in order of decreasing stereoscopic-image size irrespective of proximity to the stereoscopic image of largest size. In this case, in the example of FIG. 22, the stereoscopic image having the largest amount of parallax is the stereoscopic image 131, the stereoscopic image having the next largest amount of parallax is the stereoscopic image 133, and the stereoscopic image having the smallest amount of parallax is the stereoscopic image 132.

It may be so arranged that in a case where the zones 81 and 82 that stipulate amounts of parallax have been defined, as shown in FIG. 10, for a free-layout page, the amount of parallax is decided upon combining the amount of parallax that has been stipulated and the amount of parallax decided based upon the size of the stereoscopic image in the manner described above. For example, in a case where the amounts of parallax of the stereoscopic images 131, 132 and 133 are "LARGE", "MEDIUM" and "SMALL", respectively, and stereoscopic image 131, 132 or 133 falls within zone 82, as shown in FIG. 10, the amount of parallax of the stereoscopic image is leveled up. If stereoscopic image 131, 132 or 133 falls within zone 81, as shown in FIG. 10, then the stereoscopic image is leveled down.

Furthermore, in a case where placement of stereoscopic images that have been pasted is changed on a free-layout page, amount of parallax is changed in accordance with this change. For example, it may be so arranged that in a case where placement of a stereoscopic image is changed to the top, bottom, left or right of a page, the amount of parallax is enlarged. Further, it may be so arranged that amount of parallax is enlarged or decreased in accordance with an enlargement or a reduction in the size of the stereoscopic image.

Figure 23:
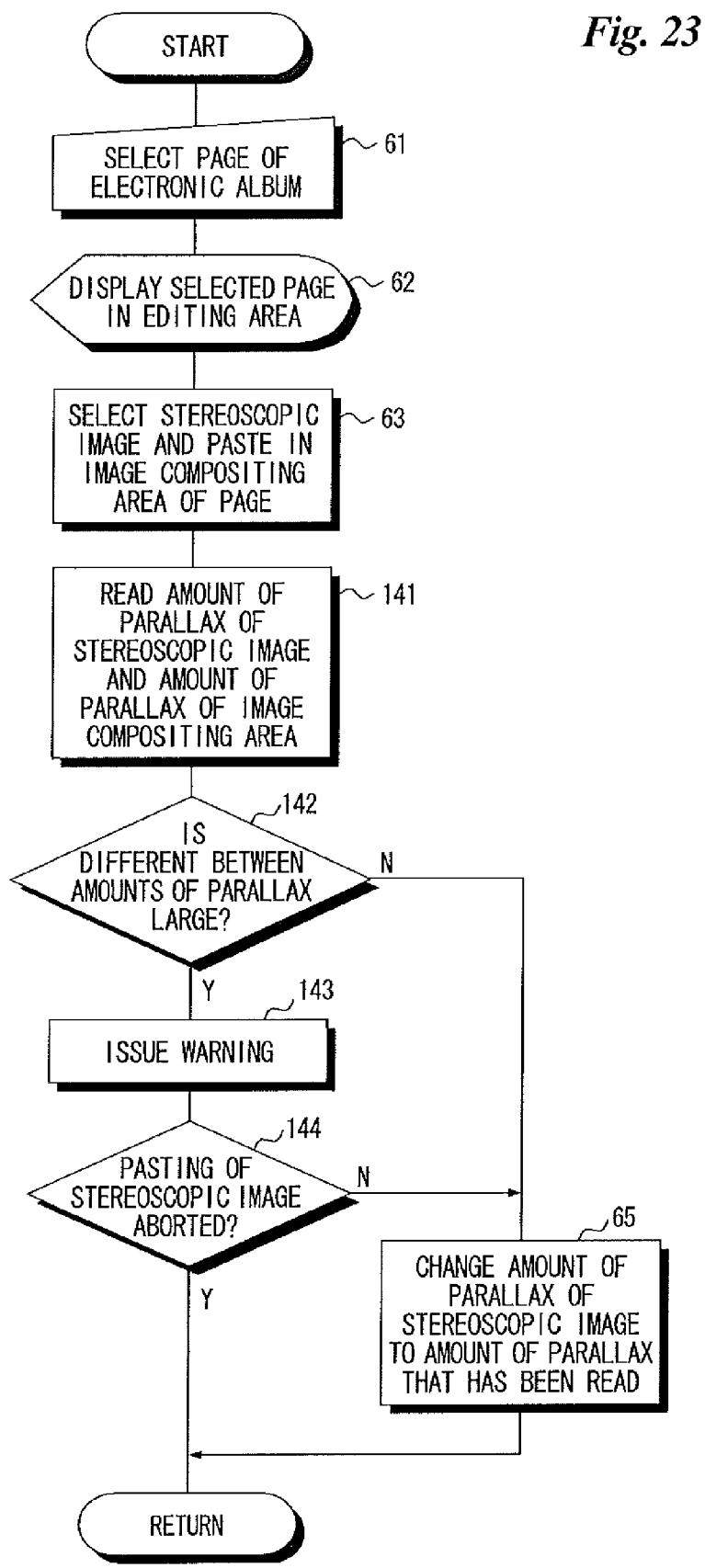
FIGS. 23 and 24 are flowcharts illustrating processing for generating an electronic album.

FIG. 23 is a flowchart illustrating processing for generating an electronic album according to another embodiment. Processing steps in FIG. 23 identical with those shown in FIG. 9 are designated by like step numbers and need not be described again.

When a page and a stereoscopic image are selected and the selected stereoscopic image is pasted in an image compositing area that has been formed on the page (steps 61 to 63), the amount of parallax that has been defined for the stereoscopic image and the amount of parallax that has been defined for the image compositing area are read (step 141).

If the difference between the read amounts of parallax is greater than a first threshold value ("YES" at step 142), a warning is issued because the disparity between the amount of parallax that has been defined for the stereoscopic image and the amount of parallax that has been defined for the image compositing area is large (step 143). If pasting of the stereoscopic image is not aborted ("NO" at step 144), then the amount of parallax of the stereoscopic image is changed to the amount of parallax of the image compositing area in which the stereoscopic image has been pasted (step 65). If pasting of the stereoscopic image is aborted ("YES" at step 144), then the processing of step 65 is skipped. It may be so arranged that pasting of a stereoscopic image is inhibited in accordance with the warning.

If the difference between the read amounts of parallax is not large ("NO" at step 142), then a warning is not issued and the amount of parallax of the stereoscopic image is changed to the amount of parallax of the image compositing area in which the stereoscopic image has been pasted (step 65).

Figure 24:
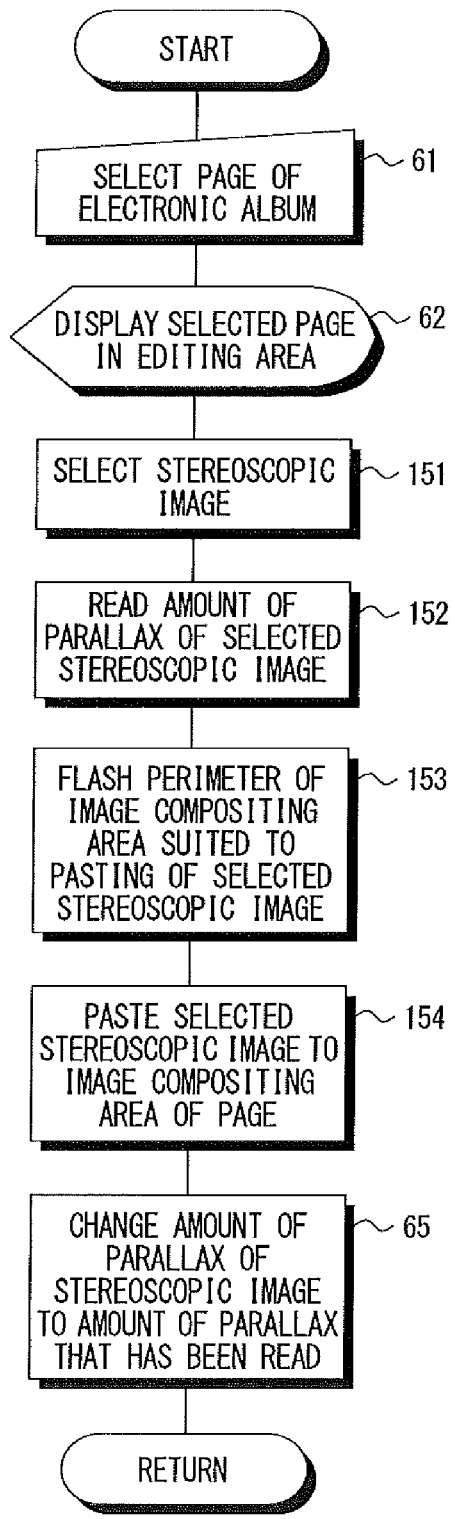
Figure 25:
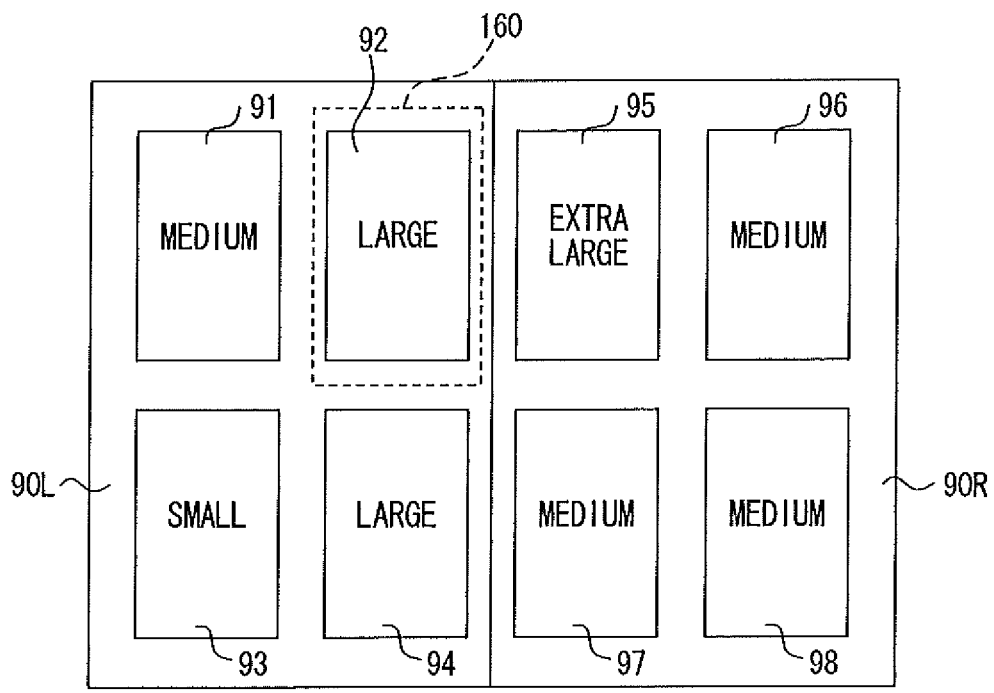
FIG. 25 is an example of an image of a page constituting an electronic album.

FIGS. 24 and 25 illustrate another embodiment. This embodiment notifies the user of a recommended image compositing area.

FIG. 24 is a flowchart illustrating processing for generating an electronic album. Processing steps in FIG. 24 identical with those shown in FIG. 9 are designated by like step numbers and need not be described again.

When a stereoscopic image is selected (step 151), the amount of parallax of the selected stereoscopic image is read (step 152). Next, the perimeter of an image compositing area for which there has been defined an amount of parallax that will cause the difference between the amount of parallax defined for the stereoscopic image and the amount of parallax defined for the image compositing area to fall below a second threshold value (namely an image compositing area that is suitable for pasting of the selected stereoscopic image) is caused to flash (step 153).

FIG. 25 illustrates the left and right pages 90L and 90R, respectively. (The left page 90L or the right page 90R can be considered a single template.) FIG. 25 corresponds to FIG. 17 and items identical with those shown in FIG. 17 are designated by like reference characters and need not be described again.

A frame 160 that flashes around the perimeter of the image compositing area 92 is being displayed. From among the image compositing areas 91 to 98, the image compositing area 92 has an amount of parallax near the amount of parallax that has been defined for the selected stereoscopic image.

Owing to the flashing of the frame 160, the user can ascertain that the image compositing area 92 enclosed by the frame 160 is an area suitable for pasting of the selected stereoscopic image.

With reference again to FIG. 24, the selected stereoscopic image is pasted in any image compositing area among the image compositing areas 91 to 98 (step 154). The amount of parallax of the stereoscopic image is changed to the amount of parallax of the image compositing area in which the stereoscopic image has been pasted (step 65).

The amount of parallax that has been defined for the above-mentioned stereoscopic image may be one that has been set using a computer rather than one that has been assigned by a stereoscopic imaging camera at the time of image capture.

In the foregoing embodiments, a stereoscopic image that is pasted on each page of an electronic album composed of a plurality of pages may be a single stereoscopic image rather than a plurality thereof.

The foregoing embodiments relate to an electronic album composed of a plurality of pages. However, the foregoing embodiments can be applied to a stereoscopic image pasting apparatus that pastes a plurality of stereoscopic image on a single template rather than an electronic album composed of a plurality of pages. In a case where a plurality of stereoscopic image are pasted on a single template, one page constituting the above-mentioned electronic album corresponds to one template. If a plurality of stereoscopic images are pasted on such a template, the above-mentioned image compositing areas (image pasting areas) may or may not be defined.

Furthermore, the electronic album includes not only the kind that can display pages turned over one at a time just as in the manner of a paper album but also the kind in which a plurality of pages are displayed in order one frame at a time as in the manner of a slideshow.

As many apparently widely different embodiments of the present invention can be made without departing from the spirit and scope thereof, it is to be understood that the invention is not limited to the specific embodiments thereof except as defined in the appended claims.

What is claimed is:

1. An electronic album generating apparatus comprising:
   an image pasting device for pasting a stereoscopic image on a page constituting an electronic album, wherein a parallax amount for a stereoscopic display has been defined for each page of the electronic album, the electronic album having a plurality of pages on which stereoscopic images are to be pasted;
   a parallax-amount reading device for reading a parallax amount that has been defined for said page on which the stereoscopic image has been pasted by said image pasting device; and
   a parallax-amount changing device for changing a parallax amount, which has been defined for the stereoscopic image that has been pasted on said page by said image pasting device, to the parallax amount that has been read by said parallax-amount reading device,
   wherein a plurality of pasting areas into which stereoscopic images are to be pasted are defined for a same page of said plurality of pages, and the parallax amount for a stereoscopic display is defined for each of the plurality of pasting areas,
   said parallax-amount reading device reads the parallax amount that has been defined for the pasting area into which a stereoscopic image has been pasted by said image pasting device,
   and the plurality of pasting areas are on the same page.

2. The apparatus according to claim 1, wherein said page is one page of a two-page spread, and a parallax amount of a pasting area that has been defined for an inner side of the page relative to the center thereof has been stipulated to be greater than a parallax amount of a pasting area that has been defined on an outer side of the page relative to the center thereof.

3. The apparatus according to claim 1, wherein said page is one page of a spread, and the apparatus further comprises a first parallax-amount revising device for revising the parallax amount in such a manner that a parallax amount of a pasting area that has been defined for an inner side of the page relative to the center thereof will be greater than a parallax amount of a pasting area that has been defined for an outer side of the page relative to the center thereof.

4. The apparatus according to claim 1, further comprising a second parallax-amount revising device which, in a case where a plurality of stereoscopic images have been pasted on the same page by said image pasting device, is for revising the parallax amount, to which the change has been made by said parallax-amount changing device, in such a manner that the greater the size of a stereoscopic image among the plurality of stereoscopic images that have been pasted on the same page, the greater the parallax amount of this stereoscopic image becomes.

5. The apparatus according to claim 1, further comprising:
   a parallax-amount adjusting device for adjusting a parallax amount of a stereoscopic image that has been pasted into a first pasting area among the plurality of the pasting areas, wherein stereoscopic images have been pasted into respective ones of the plurality of pasting areas; and
   a third parallax-amount revising device for revising amounts of parallax of pasting areas, from among the plurality of pasting areas with the exception of the pasting area that has been adjusted by said parallax-amount adjusting device, in such a manner that a size relationship among parallax amounts in the plurality of pasting areas will be the same before and after the adjustment made by said parallax-amount adjusting device.

6. The apparatus according to claim 1, further comprising a warning device for issuing a warning when the difference between a parallax amount that has been defined for a stereoscopic image pasted by said image pasting device and a parallax amount that has been defined for a pasting area into which a stereoscopic image has been pasted is greater than a first threshold value.

7. The apparatus according to claim 1, further comprising a display control device for controlling a display unit in such a manner that a pasting area, from among the plurality of pasting areas, for which has been defined a parallax amount for which the difference with respect to a parallax amount that has been defined for a stereoscopic image that will be pasted in this pasting area is less than a second threshold value, will be displayed differently from other pasting areas.

8. The apparatus according to claim 1, wherein an image for a left eye and an image for a right eye comprising the stereoscopic image are pasted to one pasting area.

9. A stereoscopic image pasting apparatus comprising:
an image pasting device for pasting a plurality of stereoscopic images on one template for which a parallax amount for a stereoscopic display has been defined;
a parallax-amount reading device for reading the parallax amount that has been defined for the template on which the plurality of stereoscopic images have been pasted by said image pasting device; and
a parallax-amount changing device for changing each parallax amount, which has been defined for the plurality of stereoscopic images that have been pasted on the template by said image pasting device, to the parallax amount that has been read by said parallax-amount reading device,
wherein a plurality of pasting areas into which stereoscopic image are pasted are defined for the same template, and a parallax amount for a stereoscopic display is defined for each of the plurality of pasting areas,
said parallax-amount reading device reads parallax amounts that have been defined for the pasting areas into which stereoscopic images have been pasted by said image pasting device,
and the plurality of pasting areas are on the same template.

10. The apparatus according to claim 9, further comprising a first parallax-amount revising device for revising the parallax amount, to which the change has been made by said parallax-amount changing device, in such a manner that the greater the size of a stereoscopic image that has been pasted by said image pasting device, the greater the parallax amount becomes.

11. The apparatus according to claim 9, further comprising:
a parallax-amount adjusting device for adjusting a parallax amount of a stereoscopic image that has been pasted in a first pasting area among the plurality of the pasting areas, wherein stereoscopic images have been pasted into respective ones of the plurality of pasting areas; and
a second parallax-amount revising device for revising amounts of parallax of pasting areas, from among the plurality of pasting areas with the exception of the pasting area that has been adjusted by said parallax-amount adjusting device, in such a manner that a size relationship among parallax amounts in the plurality of pasting areas will be the same before and after the adjustment made by said parallax-amount adjusting device.

12. The apparatus according to claim 9, further comprising a warning device for issuing a warning when the difference between a parallax amount that has been defined for a stereoscopic image pasted by said image pasting device and a parallax amount that has been defined for a pasting area into which a stereoscopic image has been pasted is greater than a first threshold value.

13. The apparatus according to claim 9, further comprising a display control device for controlling a display unit in such a manner that a pasting area, from among the plurality of pasting areas, for which has been defined a parallax amount for which the difference with respect to a parallax amount that has been defined for a stereoscopic image that will be pasted in this pasting area is less than a second threshold value, will be displayed differently from other pasting areas.

14. The apparatus according to claim 9, wherein an image for a left eye and an image for a right eye comprising the stereoscopic image are pasted to one pasting area.

15. A method of controlling operation of an electronic album generating apparatus, comprising the steps of:
pasting a stereoscopic image on a page constituting an electronic album, wherein a parallax amount for a stereoscopic display has been defined for each page of the electronic album, the electronic album having a plurality of pages on which stereoscopic images are to be pasted;
reading a parallax amount that has been defined for the page on which the stereoscopic image has been pasted; and
changing a parallax amount, which has been defined for the stereoscopic image that has been pasted on the page, to the parallax amount that has been read,
wherein a plurality of pasting areas into which stereoscopic images are to be pasted are defined for a same page of said plurality of pages, and a parallax amount for a stereoscopic display is defined for each of the plurality of pasting areas,
said parallax-amount reading device reads the parallax amount that has been defined for the pasting area into which a stereoscopic image has been pasted by said image pasting device,
and the plurality of pasting areas are on the same page.

16. A method of controlling operation of a stereoscopic image pasting apparatus, comprising the steps of:
pasting a plurality of stereoscopic images on one template for which a parallax amount for a stereoscopic display has been defined;
reading the parallax amount that has been defined for the template on which the plurality of stereoscopic images have been pasted; and
changing each parallax amount, which has been defined for the plurality of stereoscopic images that have been pasted on the template, to the parallax amount that has been read,
wherein a plurality of pasting areas into which stereoscopic image are pasted are defined for the same template, and a parallax amount for a stereoscopic display is defined for each of the plurality of pasting areas,
said parallax-amount reading device reads parallax amounts that have been defined for the pasting areas into which stereoscopic images have been pasted by said image pasting device,
and the plurality of pasting areas are on the same template.

17. A non-transitory recording medium storing a computer-readable program for controlling a computer of an electronic album generating apparatus so as to:
paste a stereoscopic image on a page constituting an electronic album, wherein a parallax amount for a stereoscopic display has been defined for each page of the electronic album, the electronic album having a plurality of pages on which stereoscopic images are to be pasted;
read a parallax amount that has been defined for the page on which the stereoscopic image has been pasted; and
change a parallax amount, which has been defined for the stereoscopic image that has been pasted on the page, to the parallax amount that has been read,
wherein a plurality of pasting areas into which stereoscopic images are to be pasted are defined for a same page of said plurality of pages, and a parallax amount for a stereoscopic display is defined for each of the plurality of pasting areas,
said parallax-amount reading device reads the parallax amount that has been defined for the pasting area into which a stereoscopic image has been pasted by said image pasting device,
and the plurality of pasting areas are on the same page.

18. A non-transitory recording medium storing a computer-readable program for controlling a computer of a stereoscopic image pasting apparatus so as to:
- paste a plurality of stereoscopic images on one template for which a parallax amount for a stereoscopic display has been defined;
- read the parallax amount that has been defined for the template on which the plurality of stereoscopic images have been pasted; and
- change each parallax amount, which has been defined for the plurality of stereoscopic images that have been pasted on the template, to the parallax amount that has been read,
- wherein a plurality of pasting areas into which stereoscopic image are pasted are defined for the same template, and a parallax amount for a stereoscopic display is defined for each of the plurality of pasting areas,
- said parallax-amount reading device reads parallax amounts that have been defined for the pasting areas into which stereoscopic images have been pasted by said image pasting device,
- and the plurality of pasting areas are on the same template.

* * * * *